(12) United States Patent
Hamaguchi

(10) Patent No.: US 9,919,964 B2
(45) Date of Patent: Mar. 20, 2018

(54) METHOD OF PROCESSING OPTICAL FIBER

(71) Applicant: FUJIKURA LTD., Tokyo (JP)

(72) Inventor: Hiroki Hamaguchi, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 14/791,624

(22) Filed: Jul. 6, 2015

(65) Prior Publication Data
US 2016/0002105 A1 Jan. 7, 2016

(30) Foreign Application Priority Data
Jul. 7, 2014 (JP) .................................. 2014-139913

(51) Int. Cl.
| | | |
|---|---|---|
| C03C 25/60 | (2006.01) | |
| G02B 6/02 | (2006.01) | |
| G01M 11/00 | (2006.01) | |
| C03B 37/01 | (2006.01) | |

(Continued)

(52) U.S. Cl.
CPC ............ *C03C 25/607* (2013.01); *C03B 37/01* (2013.01); *C03C 13/047* (2013.01); *C03C 25/106* (2013.01); *G01M 11/30* (2013.01); *G02B 6/02* (2013.01); *C03B 2201/22* (2013.01);

(Continued)

(58) Field of Classification Search
None
See application file for complete search history.

(56) References Cited

U.S. PATENT DOCUMENTS 5,983,673 A 11/1999 Urano et al.
6,499,318 B1 * 12/2002 Lemaire ................ C03C 13/047
65/379
2004/0037526 A1 2/2004 Campion et al.
(Continued)

FOREIGN PATENT DOCUMENTS

CN 1209420 A 3/1999
CN 1629665 A 6/2005
(Continued)

OTHER PUBLICATIONS

Communication dated Jun. 2, 2017 from the State Intellectual Property Office of the P.R.C. in counterpart Application No. 201510395170.9.

*Primary Examiner* — Lisa L Herring
(74) *Attorney, Agent, or Firm* — Sughrue Mion, PLLC

(57) ABSTRACT

A method of processing an optical fiber of the invention includes: a determination step of determining at least an ambient temperature of conditions of a diffusion treatment that causing an optical fiber to be subjected to an non-oxygen bridging atmosphere; an exposure step of exposing the optical fiber to a gas including an oxygen bridging element that is capable of processing the Non-Bridging Oxygen Hole Centers by being bonded to a non-bridging oxygen in the optical fiber, and causing the oxygen bridging element to infiltrate into the optical fiber; and a diffusion step of subsequently causing the optical fiber to be subjected to the non-oxygen bridging atmosphere in the exposure ambient temperature which is determined by the determination step and at which the optical fiber is subjected to the non-oxygen bridging atmosphere, and thereby diffusing the oxygen bridging element into the optical fiber.

4 Claims, 6 Drawing Sheets

(51) Int. Cl.
*C03C 13/04* (2006.01)
*C03C 25/10* (2018.01)

(52) U.S. Cl.
CPC ...... *C03C 2201/22* (2013.01); *C03C 2203/54* (2013.01); *Y02P 40/57* (2015.11)

(56) References Cited

U.S. PATENT DOCUMENTS

| | | |
|---|---|---|
| 2005/0239003 A1 | 10/2005 | Chiodini et al. |
| 2005/0257571 A1 | 11/2005 | Koaizawa et al. |
| 2005/0284184 A1 | 12/2005 | Baynham et al. |
| 2006/0016225 A1 | 1/2006 | Campion et al. |
| 2012/0219260 A1 | 8/2012 | Oyamada |

FOREIGN PATENT DOCUMENTS

| | | |
|---|---|---|
| CN | 1715226 A | 1/2006 |
| JP | 4948718 B2 | 6/2012 |
| JP | 2012-193102 A | 10/2012 |

\* cited by examiner

METHOD OF PROCESSING OPTICAL FIBER

CROSS-REFERENCE TO RELATED APPLICATION

This application is based on and claims priority from Japanese Patent Application No. 2014-139913 filed on Jul. 7, 2014, the contents of which are incorporated herein by reference in their entirety.

BACKGROUND OF THE INVENTION

Field of the Invention

The present invention relates to a processing method of improving long-term transmission loss characteristics (hydrogen characteristics) due to Non-Bridging Oxygen Hole Centers (NBOHC) in an optical fiber after drawing a silica-based optical fiber. Particularly, the present invention relates to a method of determining the temperature at which an optical fiber is left in air in the processing method and an estimation method of optimally estimating the amount of an oxygen bridging element (deuterium or hydrogen) necessary for processing NBOHC in the processing method.

Description of the Related Art

Generally, in a step of drawing an optical fiber using a silica-based glass, a glass preform is subjected to a high temperature, is extended at a large tension, and furthermore is rapidly cooled. In the foregoing step, it is known that when an optical fiber is quickly cooled in a state where a glass structure is broken, silica bonding (Si—O—Si) is broken at the cooling point, and the point (Si—O.) at which non-bridging oxygen exists may occur as a defect at the cooling point. The foregoing defect is commonly referred to as a non-bridging oxygen defect or a non-bridging oxygen hole center (NBOHC: Non Bridging Oxygen Hole Center). In the case where an optical fiber containing a large amount of the above-described NBOHC is used in an atmosphere including hydrogen for a long time, hydrogen (H) that is doped into the optical fiber from the atmosphere is bonded to NBOHC, a —OH group is generated, and a transmission loss thereof gradually increases near a wavelength of 1380 nm. This means that, long-term loss characteristics (hydrogen characteristics) of the optical fiber are deteriorated in an atmosphere including hydrogen.

Conventionally, as a result of carrying out deuterium treatment to an optical fiber after a silica-based optical fiber is drawn and before deterioration in a transmission loss due to hydrogen occurs, it is known that it is possible to prevent an increase in transmission loss near a wavelength of 1380 nm.

The deuterium treatment is a process of causing a drawn optical fiber to be subjected to an atmosphere including deuterium (D) that is an isotope of hydrogen, causing the deuterium to infiltrate into the optical fiber, causing the deuterium to be bonded to non-bridging oxygen (O.) of NBOHC (i.e., non-bridging oxygen is bridged by deuterium, an OD group occurs), and thereby extinguishing NBOHC. As stated above, as a result of extinguishing NBOHC in the optical fiber in advance before using the optical fiber as a product, it is possible to prevent transmission loss characteristics from being degraded due to hydrogen (hydrogen characteristics can be improved) even where hydrogen is infiltrated into the optical fiber product from the atmosphere including hydrogen in the case of using the optical fiber product after extinguishing treatment.

Methods of using the above-described deuterium treatment are specifically disclosed in, for example, Japanese Patent No. 4948718 (hereinafter, referred to as Patent Document 1) and Japanese Unexamined Patent Application, First Publication No. 2012-193102 (hereinafter, referred to as Patent Document 2).

Patent Document 1 is known as a fundamental patent regarding deuterium treatment. In the disclosure of Patent Document 1, a method including: a step of allowing an optical fiber to come into contact with a mixed gas including deuterium; and a step of subsequently removing the mixed gas in air or nitrogen is disclosed. In this method, the step of allowing the optical fiber to come into contact with the mixed gas including deuterium is carried out in the temperature range of 20° C. to 40° C.

However, Patent Document 1 does not completely disclose the reason that the optical fiber is subjected to the mixed gas including deuterium in the temperature range of 20° C. to 40° C. Therefore, it is unclear whether or not the temperature range of 20° C. to 40° C. is effective to carry out deuterium treatment in the optimal time period, and particularly it is unclear whether or not this temperature range is effective to carry out deuterium treatment in the necessary, sufficient, and shortest time period.

Furthermore, in Patent Document 1, after the step of causing the optical fiber to be subjected to the mixed gas including deuterium, the step of removing the mixed gas in air or nitrogen is carried out. Particularly, paragraph 0036 of Patent Document 1 describes, "the fiber is maintained in the mixed gas including deuterium at a constant time period in which deuterium existing in the mixed gas is doped into and sufficiently reacted with the fiber. This period is particularly determined by the temperature and factors associated with the contained amount of deuterium in the mixed gas.". Furthermore, paragraph 0037 of Patent Document 1 describes "after completion of reaction and before shipment, in order for degasification, the optical fiber is removed and maintained in a neutral atmosphere such as nitrogen or air. During this step, excessive deuterium that similarly provides an absorption band exists in the entire fiber is discharged".

According to the description of Patent Document 1, it is possible to read that, from the step of causing deuterium to infiltrate into the optical fiber to the step of continuously diffusing deuterium into the optical fiber, that is, until completion of deuterium treatment, an optical fiber is subjected to the mixed gas including deuterium.

In the case of continuously allowing the optical fiber to be exposed to the atmosphere including deuterium until deuterium treatment completion as described above, a processing speed increases; however, deuterium is wastefully added into the optical fiber. Moreover, not only this, but also it is known that if deuterium molecules excessively remain in the optical fiber, an excessive loss in transmission band occurs due to the effect of the excessive deuterium. For this reason, in the method disclosed in Patent Document 1, the step of removing the deuterium gas is carried out after completion of deuterium treatment (infiltration and diffusion of deuterium). However, in this method, since a long period of time is required for degasification, as a result, it is conceivable that the total processing time cannot be shortened.

Because of this, it is thought that, deuterium is infiltrated into the optical fiber by exposing the optical fiber to the atmosphere including deuterium in the minimum time required for exposure so that deuterium is not excessively added to the optical fiber, thereafter the degasification time is shorted by diffusing the deuterium into the inside of the optical fiber in air. In this case, the rate of diffusion is lower than that in the case of continuously exposing the optical fiber to the atmosphere including deuterium; however, in terms of results, it is believed that the total length of time decreases.

In the technique disclosed in Patent Document 2, it is believed that the method described above is utilized which allows deuterium to be infiltrated into the optical fiber by exposing the optical fiber to the atmosphere including deuterium in the minimum time required for exposure, and thereafter diffuses the deuterium into the inside of the optical fiber in air.

A method of processing an optical fiber disclosed in Patent Document 2 basically includes: a diffusion step of exposing a silica glass to an atmosphere including deuterium in a predetermined amount of time and thereby diffusing deuterium molecules into the silica glass; a high-temperature maintaining step of maintaining the silica glass at a temperature of 40° C. or higher; and a cooling step of subsequently cooling the silica glass so that the temperature thereof becomes a room temperature as described in claim 1 thereof.

Specifically, regarding the processing method disclosed in Patent Document 2, as described in process 1 of (Optical Fiber Deuterium Treatment) in paragraphs 0023 to 0026, steps are disclosed in which "deuterium exposure at a room temperature for approximately 1 day", "air atmosphere exposure for approximately 1 day", and "a step of maintaining at high-temperature in an air atmosphere at 40° C." are carried out in this order. According to the description of Patent Document 2, it is possible to read that, "deuterium exposure at a room temperature for approximately 1 day" and "air atmosphere exposure for approximately 1 day" correspond to "a diffusion step" described in claim 1. That is, it is conceivable that "diffusion step" described in claim 1 of Patent Document 2 includes the steps in which the optical fiber is exposed to the deuterium atmosphere, deuterium is infiltrated into the optical fiber, the optical fiber is further subjected to an air atmosphere, and deuterium is diffused into the optical fiber. Particularly, in the method disclosed in Patent Document 2, it is believed that, the reason why a high temperature is maintained by making a temperature higher after completion of the diffusion step is because it is necessary to expedite degasification by raising the temperature since a large amount of deuterium is doped into the optical fiber. Moreover, Patent Document 2 also does not disclose that the temperature in the air atmosphere exposure (air atmosphere exposure before the step of maintaining at high-temperature at 40° C.) shortly after deuterium exposure at a room temperature is adjustable in accordance with the optical fiber serving as the processing target.

Additionally, as a process of improving the hydrogen characteristics, in order to prevent an increase in transmission loss due to NBOHC near a wavelength of 1380 nm in a commonly-used optical fiber for communication from increasing, a processing using a gas including deuterium is generally carried out. Furthermore, as described below again, special optical fibers (optical fibers or the like used in a wavelength region in which a transmission loss near a wavelength of 1380 nm does not particularly interfere therewith) may be processed by using a gas including hydrogen. Hydrogen bonds to NBOHC, thereby generates an OH group (Consequently, NBOHC is extinguished), and make a transmission loss near a wavelength of 1380 nm higher. Regarding special optical fibers which use, as a transmission band, a wavelength region in which a transmission loss near a wavelength of 1380 nm does not particularly interfere therewith, it is conceivable that hydrogen processing is carried out in advance instead of a deuterium treatment. In the present description, both deuterium and hydrogen are referred to as an oxygen bridging element that bonds (bridges) to non-bridging oxygen in the optical fiber and can process non-bridging oxygen holes. However, in the below description, as a representative example of the oxygen bridging element, the oxygen bridging element may simply be referred to as deuterium.

As evidenced by each of the aforementioned patent documents, infiltration of deuterium into the optical fiber and diffusion of deuterium into the optical fiber require a long amount of time. Accordingly, as long as after a long period of time elapses and after the start of deuterium treatment, it cannot be determined whether or not a practically-sufficient amount of deuterium can be included in the optical fiber, that is, whether or not the effect due to the deuterium treatment is sufficiently obtained. The specific time varies depending on the conditions of producing the optical fiber or the conditions of the deuterium treatment; however, a degree of the effect due to the deuterium treatment can be measured after 1 to 2 days or more elapse at the earliest. Accordingly, in this case, unless 1 to 2 days or more elapse, it is not possible to evaluate the effect due to deuterium treatment.

For this reason, conventionally, a processing time is generally set to be longer than necessary so as to reliably evaluate the effect due to deuterium treatment. However, in the case of unnecessarily setting the processing time to be longer, deuterium excessively remains in the optical fiber as mentioned above. Because of this, in order to prevent loss characteristics from being deteriorated due to the excessive deuterium, it is necessary to add a degasification step described in Patent Document 1 to treatment steps. As a result, the total processing time becomes further longer.

In contrast, in the case of simply raising the temperature in the diffusion step in order to speed up the throughput speed, the diffusion of deuterium in the direction toward the center of the optical fiber is expedited, and there is a possibility that the processing time can be shortened; however, in the case of unnecessarily raising the temperature in this step, the diffusion in the direction toward the outside of the optical fiber is expedited. Consequently, even in the case of raising the temperature, unless the temperature is set to a suitable temperature, diffusion and removal of deuterium toward the outside of the optical fiber is quickly carried out, and the effect due to the deuterium treatment cannot be sufficiently obtained. However, in conventional technique, it is not completely considered that a processing time is shortened as a result of suitably adjusting the temperature in consideration of the above-described diffusion of deuterium toward the outside of the optical fiber.

SUMMARY OF THE INVENTION

The invention was made in view of the above-described situation, and provides a method of basically preventing an increase in loss with time due to bonding of hydrogen in air to NBOHC. In the case where steps (deuterium treatment or hydrogen processing) are carried out which cause a gas including an oxygen bridging element (typically, deuterium, in some cases, hydrogen) that bonds (bridges) to non-bridging oxygen and can process NBOHC so that it infiltrates into an optical fiber and the oxygen bridging element diffuses thereinto, the present invention provides a method that: can minimize and shorten the total processing time required for treatment while sufficiently maintaining the effect due to the treatment; adequately determines a processing temperature, particularly, an ambient temperature of the step in which the optical fiber is subjected to a non-oxygen bridging atmosphere such as air which is used for diffusion of the element into the optical fiber after the optical fiber is exposed to a gas including an oxygen bridging element such as deuterium; exposes the optical fiber to the non-oxygen bridging atmosphere at the determined temperature; and can shorten the processing time. Furthermore, as an estimation method of estimating the amount of an oxygen bridging element (deuterium or hydrogen) required for processing NBOHC in the foregoing optical fiber treatment, the invention provides a method that can simply estimate the amount thereof without using a specific and expensive measurement apparatus.

The present invention basically focuses attention on that: the ambient temperature of the step (diffusion step) in which the optical fiber is left in a non-oxygen bridging atmosphere that does not include an oxygen bridging element, for example, the optical fiber is left in air after an optical fiber is exposed to a gas atmosphere including an oxygen bridging element, significantly affects the diffusion of the oxygen bridging element into the optical fiber; and the diffusion behavior of the oxygen bridging element in the optical fiber during the passage of time varies depending on the temperature at which the optical fiber is subjected to the non-oxygen bridging atmosphere. That is, as mentioned above, in the case of simply raising the ambient temperature at which the optical fiber is subjected to the non-oxygen bridging atmosphere in order to speed up the rate of diffusion, the diffusion of deuterium in the direction toward the center of the optical fiber is expedited, and there is a possibility that the processing time can be shortened; however, in the case of unnecessarily raising the temperature in this step, the diffusion in the direction toward the outside of the optical fiber is expedited. Because of this, even in the case of raising the temperature, unless the temperature is set to a suitable temperature, deuterium is quickly diffused into the outside of the optical fiber and is removed therefrom, and the effect of improvement in the hydrogen characteristics cannot sufficiently be obtained. This means that, in order to shorten the length of processing time, it is necessary to suitably set the temperature therefor in consideration of the diffusion of deuterium toward the outside of the optical fiber.

From the above-described standpoint, in the invention, the ambient temperature of the step (diffusion step) in which the optical fiber is subjected to the non-oxygen bridging atmosphere after the optical fiber is exposed to the gas atmosphere including the oxygen bridging element is suitably adjusted so that the amount of the oxygen bridging element such as deuterium required for processing NBOHC of the optical fiber can be supplied to the center of the optical fiber in as a short time as possible.

Additionally, before the optical fiber is exposed to the atmosphere including the oxygen bridging element such as deuterium, the amount of NBOHC of the entire optical fiber including a core and a cladding is estimated in advance. Furthermore, based on a diffusion model of gaseous molecules of an oxygen bridging element such as deuterium, regarding the oxygen bridging elements that are supplied in the optical fiber by exposing the optical fiber to the atmosphere including the oxygen bridging element, in the exposure period in which the optical fiber is subjected to the non-oxygen bridging atmosphere, the correlation between the exposure ambient temperature at which the optical fiber is subjected to the non-oxygen bridging atmosphere, the exposure time in which the optical fiber is subjected to the non-oxygen bridging atmosphere, and the amount of the oxygen bridging element in the optical fiber is determined. Based on the correlation, the exposure ambient temperature at which the optical fiber is subjected to the non-oxygen bridging atmosphere is determined. As a result of determining the exposure ambient temperature at which the optical fiber is subjected to the non-oxygen bridging atmosphere in this manner, practically exposing the optical fiber to the atmosphere including the oxygen bridging element, and causing the optical fiber to be subjected to the non-oxygen bridging atmosphere (diffusion), it is possible to ensure, in the optical fiber, the amount of oxygen bridging elements required for processing NBOHC of the entire optical fiber in the shortest amount of time. Furthermore, in addition to this, it is possible to effectively prevent occurrence of the situation where the effect of extinguishing NBOHC cannot be sufficiently provided due to lack of supply of the oxygen bridging element to the optical fiber.

Specifically, a method of processing an optical fiber according to a first aspect of the invention, basically includes: a preparation step of preparing an optical fiber that includes a core and a cladding surrounding the core and that is made of a silica-based glass; a determination step (non-oxygen bridging atmosphere exposure condition determination step) of determining at least an ambient temperature of conditions of a diffusion treatment that causing the optical fiber to be subjected to an non-oxygen bridging atmosphere not including an oxygen bridging element, the determination step including: a first step of estimating an amount of Non-Bridging Oxygen Hole Centers (NBOHC) in the entire optical fiber and estimating an amount of the oxygen bridging element required for processing the Non-Bridging Oxygen Hole Centers in the entire optical fiber; a second step of determining correlation that is based on a diffusion model of gaseous molecules of an oxygen bridging element, is related to the oxygen bridging element supplied to the optical fiber, and is between an exposure ambient temperature at which the optical fiber is subjected to the non-oxygen bridging atmosphere, an exposure time at which the optical fiber is subjected to the non-oxygen bridging atmosphere in an exposure period in which the optical fiber is subjected to the non-oxygen bridging atmosphere, and the amount of the oxygen bridging element in the optical fiber; and a third step of determining, based on the correlation determined by the second step, the exposure ambient temperature at which the optical fiber is subjected to the non-oxygen bridging atmosphere; an exposure step (oxygen-bridging-element-including gas exposure step) of exposing the optical fiber to a gas including an oxygen bridging element that is capable of processing the Non-Bridging Oxygen Hole Centers by being bonded (bridged) to a non-bridging oxygen in the optical fiber, and causing the oxygen bridging element to infiltrate into the optical fiber; and a diffusion step of subsequently causing the optical fiber to be subjected to the non-oxygen bridging atmosphere in the exposure ambient temperature which is determined by the third step of the determination step and at which the optical fiber is subjected to the non-oxygen bridging atmosphere, and thereby diffusing the oxygen bridging element into the optical fiber.

In the method of processing the optical fiber according to the foregoing aspect, in order to prevent long-term transmission characteristics from being degraded due to Non-Bridging Oxygen Hole Centers (NBOHC) during use of the optical fiber product and in order to bond NBOHC in the optical fiber to oxygen bridging elements (deuterium or hydrogen) in advance, after the optical fiber is exposed to the gas atmosphere including the oxygen bridging element, the optical fiber is subjected to the non-oxygen bridging atmosphere such as air for the diffusion of the oxygen bridging element into the optical fiber. In the case where the optical fiber is subjected to the non-oxygen bridging atmosphere as described above, before the optical fiber is exposed to the gas atmosphere including the oxygen bridging element, the needed amount of the oxygen bridging element to be infiltrated into the entire optical fiber is estimated, the relationship between the temperature and the length of time in which the optical fiber is subjected to the non-oxygen bridging atmosphere corresponding to the estimated needed amount of the oxygen bridging element is further determined, and it is possible to determine in advance an optimal temperature in the step of causing the optical fiber to be subjected to the non-oxygen bridging atmosphere. Particularly, as a result of preliminarily determining the minimal exposure temperature at which it is possible to complete the step of exposing the optical fiber to the non-oxygen bridging atmosphere in the shortest amount of the exposure time, the time length of the step of causing the optical fiber to be subjected to the non-oxygen bridging atmosphere can be considerably shorter than ever before, and the total processing time can be considerably shorter than ever before. Additionally, as a result of preliminarily selecting the proper temperature at which the optical fiber is subjected to the non-oxygen bridging atmosphere and the length of time therefor, it is possible to easily provide a necessary and sufficient amount of the oxygen bridging elements to the inside of optical fiber when completion of the step of causing the optical fiber to be subjected to the non-oxygen bridging atmosphere. As a result, it is possible to solve the problem in that the hydrogen characteristics cannot be sufficiently improved due to the insufficient amount of the oxygen bridging elements in the optical fiber, the problem in that the oxygen bridging elements excessively remain in the optical fiber and the hydrogen characteristics is thereby deteriorated due to the excessive oxygen bridging elements, or the problem in that a long-term degasification process is required for removing the excessive oxygen bridging elements.

In the optical fiber processing method according to the first aspect of the invention, a gas including deuterium may be used as the gas including the oxygen bridging element.

In the optical fiber processing method according to the first aspect of the invention, the non-oxygen bridging atmosphere may be an air atmosphere.

In the optical fiber processing method according to the first aspect of the invention, in the third step of the determination step, based on the correlation determined by the second step, an exposure temperature and a corresponding exposure time corresponding to the exposure temperature may be determined, the exposure temperature being capable of causing the amount of the required oxygen bridging element to exist in the optical fiber after the optical fiber is subjected to the non-oxygen bridging atmosphere for the shortest period of time, the exposure temperature and the corresponding exposure time may be, respectively, determined as a temperature and a time, at which the optical fiber is subjected to the non-oxygen bridging atmosphere in the diffusion step, the diffusion step may be carried out under the condition of the determined temperature and the determined time.

In the optical fiber processing method according to the first aspect of the invention, the first step of the determination step may include: a first process of estimating an amount of Non-Bridging Oxygen Hole Centers in the core based on transmission loss measurement data obtained by measuring a transmission loss of the optical fiber before the exposure step; a second process of estimating the amount of Non-Bridging Oxygen Hole Centers in the entire optical fiber, based on correlation between an amount of Non-Bridging Oxygen Hole Centers in the entire optical fiber which is determined from cumulative result data associated with optical fibers and the amount of Non-Bridging Oxygen Hole Centers in the core, and based on the estimated amount of Non-Bridging Oxygen Hole Centers in the core; and a third process of estimating the amount of the oxygen bridging element required for processing the Non-Bridging Oxygen Hole Centers in the entire optical fiber based on the estimated amount of Non-Bridging Oxygen Hole Centers in the entire optical fiber.

In the optical fiber processing method according to the first aspect of the invention, in the first process of the first step of the determination step, wavelength region data of the transmission loss measurement data obtained by measuring a transmission loss of the optical fiber before the exposure step, which avoids an absorption peak due to the Non-Bridging Oxygen Hole Centers, may be externally fitted on a wavelength region in which the absorption peak exists, a transmission loss at the absorption peak due to the Non-Bridging Oxygen Hole Centers may be thereby determined, and the amount of Non-Bridging Oxygen Hole Centers in the core may be estimated based on the transmission loss.

In the optical fiber processing method according to the first aspect of the invention, in the first process of the first step of the determination step, measurement data associated with a short-wavelength $\lambda$ with respect to a transmission loss in which the wavelength $\lambda$ of the optical fiber is less than or equal to 1000 nm may be converted into $\lambda^{-4}$, loss data of a wavelength region including a region other than a wavelength region in which $\lambda^{-4}$ is 4 to 8 and including at least a region in which $\lambda^{-4}$ is 2 to 3 may be subjected to linear approximation, a difference between a transmission loss value of 630 nm on an extension line of the approximation straight line and a practically-measured transmission loss value of 630 nm may be defined as a transmission loss due to the Non-Bridging Oxygen Hole Centers, and the amount of Non-Bridging Oxygen Hole Centers in the core may be estimated based on the transmission loss.

Furthermore, a second aspect of the invention provides a method of estimating the amount of the oxygen bridging element required for processing the Non-Bridging Oxygen Hole Centers (NBOHC) of the entire optical fiber by estimating the optimal amount of NBOHC of the entire optical fiber, which is applicable to the first step of the non-oxygen bridging atmosphere exposure condition determination step in the processing method according to the aforementioned first aspect.

Specifically, an estimation method in the optical fiber process according to a second aspect of the invention is a method of estimating an amount of oxygen bridging element required for processing Non-Bridging Oxygen Hole Centers in an entire optical fiber that comprises a core and a cladding surrounding the core and that is made of a silica-based glass in the case of exposing the optical fiber to a gas including an oxygen bridging element that is capable of processing the Non-Bridging Oxygen Hole Centers by being bonded to a non-bridging oxygen in the optical fiber, and causing the oxygen bridging element to infiltrate into the optical fiber. The method includes: a first process of obtaining transmission loss data by measuring a transmission loss of the optical fiber before exposing the optical fiber to the gas including the oxygen bridging element, and estimating the amount of Non-Bridging Oxygen Hole Centers in the core based on the transmission loss data; a second process of estimating the amount of Non-Bridging Oxygen Hole Centers in the entire optical fiber, based on correlation between an amount of Non-Bridging Oxygen Hole Centers in the entire optical fiber which is determined from cumulative result data associated with optical fibers in previous cases and the amount of Non-Bridging Oxygen Hole Centers in the core, and based on the estimated amount of Non-Bridging Oxygen Hole Centers in the core; and a third process of estimating the amount of the oxygen bridging element required for processing the Non-Bridging Oxygen Hole Centers in the entire optical fiber based on the estimated amount of Non-Bridging Oxygen Hole Centers in the entire optical fiber.

In the estimation method in the optical fiber process according to the foregoing aspect, the amount of oxygen bridging element (deuterium or hydrogen) required for extinguishing Non-Bridging Oxygen Hole Centers (NBOHC) is estimated. In the case of estimating the amount of the required oxygen bridging element, as a result of estimating the amount of NBOHC of the entire optical fiber based on measurement result of the transmission loss of the optical fiber (a loss in the core), it is possible to simply and easily estimate the amount of the oxygen bridging element required for processing NBOHC of the entire optical fiber at a low cost without using a specific and expensive measurement apparatus.

In the estimation method in the optical fiber process according to the second aspect of the invention, the gas including the oxygen bridging element may be a gas including deuterium.

In the estimation method in the optical fiber process according to the second aspect of the invention, the non-oxygen bridging atmosphere may be an air atmosphere.

In the estimation method in the optical fiber process according to the second aspect of the invention, in the first process, wavelength region data of transmission loss measurement data obtained in advance by measuring a transmission loss of the optical fiber, which avoids an absorption peak due to the Non-Bridging Oxygen Hole Centers, may be externally fitted on a wavelength region in which the absorption peak exists, a transmission loss at the absorption peak due to the Non-Bridging Oxygen Hole Centers may be thereby determined, and the amount of Non-Bridging Oxygen Hole Centers in the core may be estimated based on the transmission loss.

In the estimation method in the optical fiber process according to the second aspect of the invention, in the first process, measurement data associated with a short-wavelength $\lambda$ with respect to a transmission loss in which the wavelength $\lambda$ of the optical fiber is less than or equal to 1000 nm may be converted into the fourth root of $\lambda$ ($\lambda^{-4}$) (unit: µm), loss data of a wavelength region including a region other than a wavelength region in which $\lambda^{-4}$ is 4 to 8 and including at least a region in which $\lambda^{-4}$ is 2 to 3 may be subjected to linear approximation, a difference between a transmission loss value of 630 nm on an extension line of the approximation straight line and a practically-measured transmission loss value of 630 nm may be defined as a transmission loss due to the Non-Bridging Oxygen Hole Centers, and the amount of Non-Bridging Oxygen Hole Centers in the core may be estimated based on the transmission loss.

Effects of the Invention

According to the optical fiber processing method of the first aspect of the invention, the total processing time can be considerably shorter than ever before.

Furthermore, according to the estimation method in the optical fiber process of the second aspect of the invention, it is possible to simply and easily estimate the amount of the oxygen bridging element required for processing NBOHC of the entire optical fiber at a low cost without using a specific and expensive measurement apparatus.

DETAILED DESCRIPTION OF THE INVENTION

Hereinafter, an embodiment of the invention will be described with reference to drawings.

Basically, in the method of processing the optical fiber according to the embodiment of the invention, an optical fiber (target optical fiber) formed of a silica-based glass configured to include a core and a cladding that surrounds the core is subjected to the processing. Here, the specific configuration of the optical fiber or the kinds thereof is not limited; the embodiment of the invention is applied to an optionally-selected optical fiber such as a single-mode optical fiber that is used as a most generally-used optical fiber for communication or a multi-mode optical fiber. Moreover, the method of manufacturing the target optical fiber is not particularly limited; the optical fiber manufactured by an arbitrary method such as a vapor-phase axial deposition method, an outside vapor deposition method, or a chemical vapor deposition method is subjected to the processing according to the embodiment. Additionally, in the case of carrying out the processing method according to the embodiment of the invention, as a configuration of the optical fiber therefor, a bare optical fiber which is drawn from a glass preform by fiber drawing (drawing) is generally used. As an optical fiber, it is not limited to a bare optical fiber, an optical fiber that is subjected to a protective coating (coating) using a UV resin coating, that is, an optical fiber wire may be adopted. The embodiment of the invention is applicable to not only the above configuration but also a bare optical fiber.

In the embodiment, deuterium treatment is carried out by using hydrogen isotope, particularly, a gas including deuterium as a gas including the oxygen bridging element. Therefore, in the explanation of the embodiment, the term "deuterium" is mainly used instead of the term "a gas including the oxygen bridging element". Furthermore, in the embodiment, a non-oxygen bridging atmosphere that does not include the oxygen bridging element is an air atmosphere; therefore, in the explanation of the embodiment, "the optical fiber is subjected to a non-oxygen bridging atmosphere" is "the optical fiber is subjected to an air atmosphere".

Figure 1:
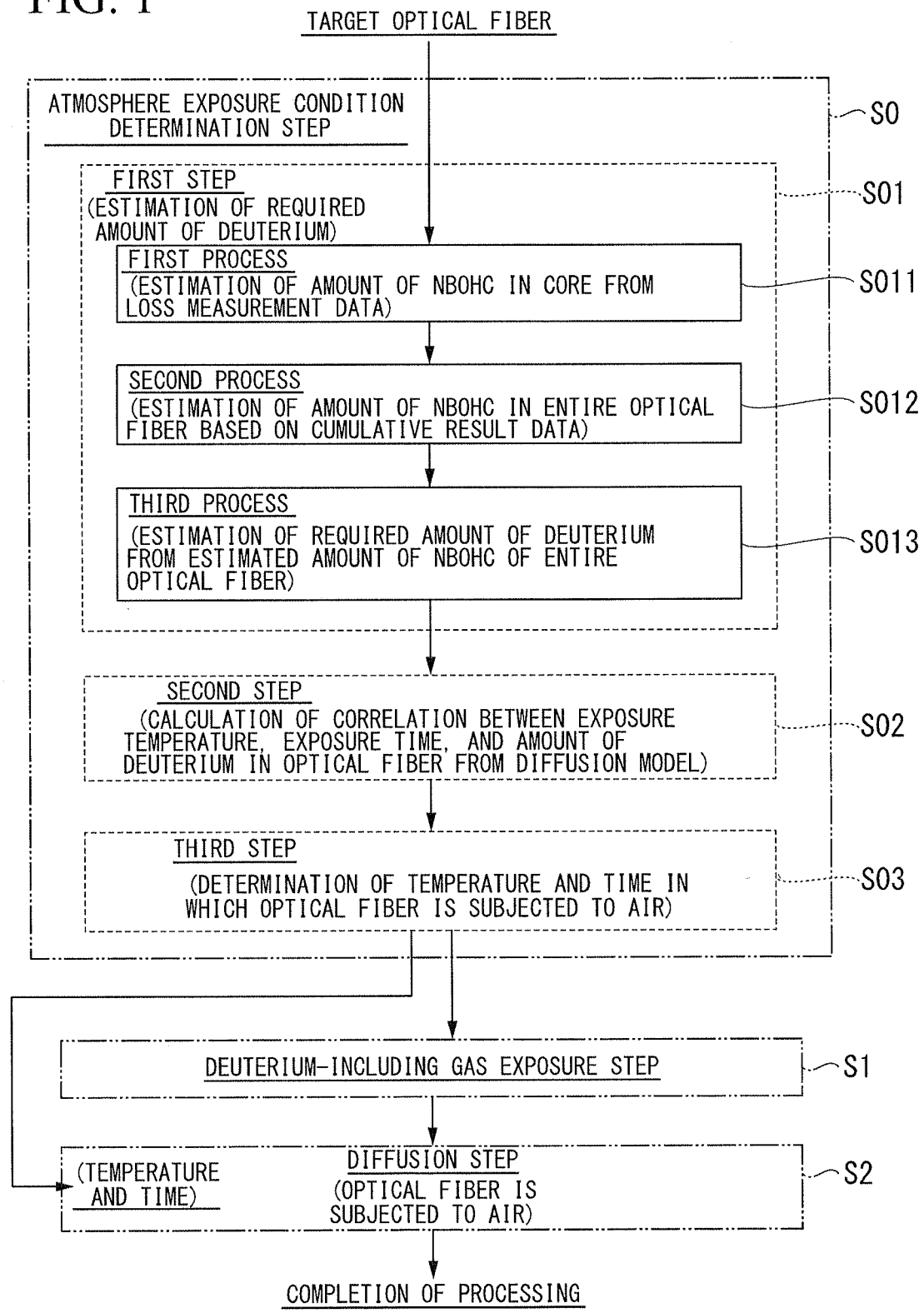
FIG. 1 is a flowchart showing a method of processing an optical fiber according to an embodiment of the invention in the case where deuterium is used as an oxygen bridging element and a non-oxygen bridging atmosphere is an air atmosphere.

FIG. 1 is a flowchart schematically showing the processing method according to the embodiment.

The processing method according to the embodiment includes: a deuterium-including gas exposure step (oxygen-bridging-element including gas exposure step) S1 that causes the optical fiber to be exposed to a gas including deuterium serving as an oxygen bridging element that is bonded (bridged) to the non-bridging oxygen in the optical fiber and can process Non-Bridging Oxygen Hole Centers (NBOHC) and cause the deuterium to be doped into the optical fiber; and a diffusion step S2 that continuously the optical fiber to be subjected to air (non-oxygen bridging atmosphere) and causes deuterium to be diffused in the optical fiber.

In the above method, it is essential to provide the atmosphere exposure condition determination step (non-oxygen bridging atmosphere exposure condition determination step) S0 that determines at least the ambient temperature of the conditions of the diffusion step S2 in which the optical fiber is subjected to air after the optical fiber is exposed to the gas including deuterium, and it is essential to carry out the atmosphere exposure condition determination step before the deuterium-including gas exposure step S1 is carried out.

Furthermore, the atmosphere exposure condition determination step S0 includes a first step S01, a second step S02, and a third step S03 which are described below.

First step S01: a step of estimating the amount of non-bridging oxygen holes in the entire optical fiber and estimating the amount of deuterium (oxygen bridging element) required for processing Non-Bridging Oxygen Hole Centers (NBOHC) in the entire optical fiber including a core and a cladding.

Second step S02: a step of determining the correlation between an air-atmosphere-exposure ambient temperature (exposure ambient temperature at which the optical fiber is subjected to the non-oxygen bridging atmosphere), an air-atmosphere-exposure time (exposure time in which the optical fiber is subjected to the non-oxygen bridging atmosphere), and the amount of deuterium in the optical fiber in an air-atmosphere-exposure period (exposure period in which the optical fiber is subjected to the non-oxygen bridging atmosphere), which are based on a diffusion model of gaseous molecules of an oxygen bridging element, regarding deuterium (oxygen bridging element) supplied to the optical fiber.

Third step S03: a step of determining an air-atmosphere-exposure ambient temperature based on the correlation determined by the second step.

Subsequently, in the diffusion step S2, the optical fiber is subjected to air at the air-atmosphere-exposure ambient temperature and time which are determined by the third step S03 of the atmosphere exposure condition determination step S0.

Particularly, in the embodiment, the first step S01 of the atmosphere exposure condition determination step S0 includes a first process S011, a second process S012, and a third process S013 which are described below.

First process S011: a step of estimating the amount of NBOHC in the core based on transmission loss measurement data obtained by measuring a transmission loss of the optical fiber before the exposure step S1 is carried out.

Second process S012: a step of estimating the amount of NBOHC in the entire optical fiber, based on the correlation between the amount of NBOHC in the entire optical fiber which is determined from cumulative result data associated with optical fibers and the amount of NBOHC in the core, and based on the estimated amount of NBOHC in the core.

Third process S013: a step of estimating the amount of deuterium (the amount of the oxygen bridging element) required for processing non-bridging oxygen holes in the entire optical fiber based on the estimated amount of NBOHC in the entire optical fiber.

In the above-described the embodiment, the processes are carried out using deuterium as an oxygen bridging element. Firstly, the principle that it is possible to improve the hydrogen characteristics of the optical fiber by deuterium treatment will be described.

Before the optical fiber is practically used as an optical fiber product, that is, before NBOHC is bonded to hydrogen in the usage environment of the optical fiber product, NBOHC that is in the core of the optical fiber, is bonded to hydrogen, and thereby causes a loss to increase in a transmission band of the generally-used optical fiber for communication is bonded to deuterium. The absorption peak of NBOHC is near 630 nm, the peak thereof after being bonded to hydrogen is near 1383 nm (in a transmission band of a commonly-used optical fiber for communication), and the peak thereof after being bonded to deuterium is near 1900 nm (in a long-wavelength side longer than a commonly-used transmission band). Because of this, as a result of intentionally bonding NBOHC to deuterium, it is possible to prevent a long-term loss from increasing in a transmission band of a commonly-used optical fiber for communication.

Here, NBOHC is distributed in the entire optical fiber including a core and a cladding. Specifically, NBOHC in the core region of the optical fiber (particularly, a —OH group that is generated by bonding NBOHC of the core region to hydrogen) causes a practical problem in the optical fiber transmission. The amount of deuterium required for extinguishing (processing) NBOHC of the core region can be estimated by analyzing the loss at the short-wavelength. The reason is that, since the absorption peak of NBOHC is located at 630 nm, the excessive loss at 630 nm (which is substantially equal to a difference between the measured actual loss and a loss due to Rayleigh scattering) corresponds to the amount of NBOHC.

However, NBOHC also exists in a cladding region. Therefore, even in the case of carrying out the processing based on the aforementioned calculated amount of deuterium, the amount of deuterium become insufficient. Here, the inventor found out that the defect distribution of the core is correlated to the defect distribution of the cladding in the case where the processing is stable (i.e., in an actual manufacturing). Consequently, as a result of multiplying the defect distribution of the core region by the statistically calculated factor (factor determined by a series of optical fiber conditions of manufacture), the amount of deuterium necessary for both the core region and the cladding region (i.e., the entire optical fiber) can be determined.

Furthermore, the condition of the diffusion of deuterium can be analytically solved using the diffusion model of the gaseous molecules in the cylindrical coordinate system. In the invention, the relationship between the amount of deuterium that is diffused toward the center of the optical fiber and the holding temperature therefor is determined by analyzation. It is thought that, when the amount of deuterium diffused toward the center of the optical fiber coincides with the amount of deuterium necessary for the above-mentioned entire optical fiber, the deuterium treatment is completed. Consequently, as a result of maintaining an ambient temperature at which the necessary amount of deuterium can be diffused to the center of the optical fiber in the shortest time, it is possible to carry out deuterium treatment in the shortest time. Additionally, from a analyzation graph, non-completion of treatment due to the amount of deuterium being insufficient, the number of days for the treatment, or the temperature range which is not adequate in actual steps and should be avoided from the steps are determined.

Next, steps S01 to S03 and processes S011 to S013 in the atmosphere exposure condition determination step S0 in the embodiment will be particularly described with reference to FIGS. 2 to 10.

(First Step S01 of Estimating the Required Amount of Deuterium)

In the embodiment, firstly, the amount of NBOHC of the entire optical fiber including a core and a cladding is estimated, and the amount of deuterium required for extinguishing NBOHC is estimated based on the estimated amount of NBOHC.

As a specific method used to estimate the amount of NBOHC in the entire optical fiber in the embodiment, a method of utilizing a general direction in the loss characteristics (loss at the short-wavelength) in a short-wavelength band (for example, 600 to 1000 nm) of an optical fiber for a commonly-used optical signal transmission (communication), measuring only a loss at a short-wavelength before carrying out deuterium treatment, estimating the loss at the short-wavelength after the deuterium treatment, and estimating the necessary amount of deuterium based on the difference therebetween. The above-described estimating method is a novel method found by the inventor. Hereinbelow, the method of estimating the required amount of deuterium will be particularly described.

It is known that a loss at a short-wavelength of a commonly-used optical fiber for transmission becomes large at a wavelength of near 630 nm. This means that, in the case of measuring a loss at a short-wavelength of a commonly-used optical fiber for transmission before carrying out deuterium treatment, the peak of the loss at the short-wavelength appears at a 630 nm-band of the wavelength $\lambda$ as indicated by the solid line A0 shown in FIG. 2.

Figure 2:
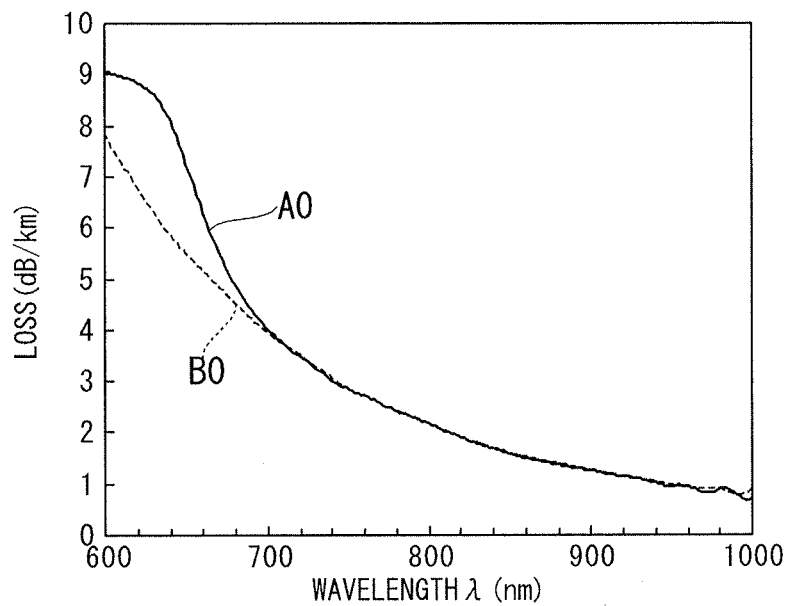
FIG. 2 is a chart showing a first process S011 of a first step S01 in the atmosphere exposure condition determination step S0 in the embodiment of the invention and showing the relationship between the wavelength (unit: nm) and the transmission loss in a core.

When a loss at a short-wavelength is measured after the foregoing optical fiber is subjected to deuterium treatment, the peak of the loss at the short-wavelength at the 630 nm-band of the wavelength that appeared before the deuterium treatment is extinguished as indicated by the broken line B0 shown in FIG. 2.

The reason is that, a absorption band of NBOHC near 630 nm that appeared before the deuterium treatment disappears due to being subjected to deuterium treatment. This is because, NBOHC at the 630 nm-band of the wavelength is converted into —OD group by carrying out the deuterium treatment, the absorption peak appears at a completely different wavelength region (generally, near 1900 nm), and therefore the absorption peak at the 630 nm-band of the wavelength is extinguished.

Figure 3:
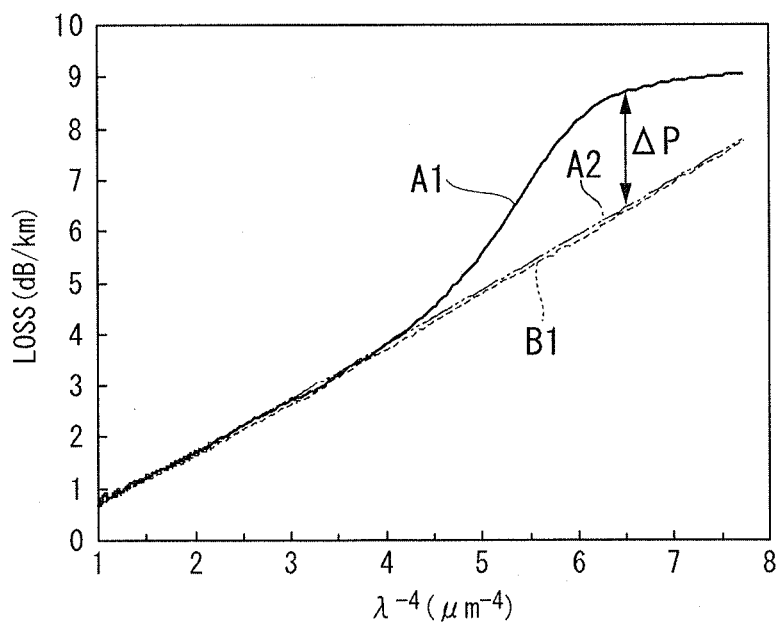
FIG. 3 is a chart showing the first process S011 of the first step S01 in the atmosphere exposure condition determination step S0 in the embodiment of the invention and showing the relationship between the wavelength (unit: µm) and the transmission loss in a core where the wavelength is converted into $\lambda^{-4}$.

In FIG. 2, the x-axis of the graph showing a transmission loss of the short-wavelength band represents a wavelength $\lambda$ (unit: nm). In the case of converting the values of the x-axis into the fourth root of the wavelength $\lambda$ (unit: μm), that is, converting the $\lambda$ into $\lambda^{-4}$, the characteristics shown in FIG. 3 are obtained. In FIG. 3, the solid line A1 corresponds to the solid line A0 shown in FIG. 2 and represents the loss characteristics before carrying out the deuterium treatment, and the broken line B1 corresponds to the broken line B0 shown in FIG. 2 and represents the loss characteristics after carrying out the deuterium treatment.

In FIG. 2, the line B0 representing the loss characteristics after carrying out the deuterium treatment is a curved line. By converting the wavelength $\lambda$ into the fourth root of $\lambda$, the linear line B1 is obtained as shown in FIG. 3. As stated above, the line B1 obtained by the fourth root of $\lambda$ is linear. The reason is that, the most part of the loss of the optical fiber which is the loss due to Rayleigh scattering is proportional to the fourth root of the wavelength $\lambda$. In other words, if the transmission loss is the same as the loss due to Rayleigh scattering, the relation is obtained that the loss is proportional to the fourth root of the wavelength $\lambda$, that is, it is the linear relationship.

Here, it is apparent from FIG. 3 that, the line A1 overlaps the line B1 in a wavelength region in which the loss at the short-wavelength due to NBOHC is substantially absent, that is, in the region (region in which $\lambda^{-4}$ is 1 to 4 $\mu m^{-4}$) that is out of the absorption peak due to NBOHC, and furthermore the lines are straight lines as described above. Accordingly, as a result of linearly extending the line A1 representing the loss characteristics before carrying out the deuterium treatment from the region in which $\lambda^{-4}$ is 1 to 4 $\mu m^{-4}$ to the region in which $\lambda^{-4}$ exceeds 4 $\mu m^{-4}$ (the region including the 630 nm-band of the wavelength) (the extension line is indicated as the dashed-two dotted line A2 shown in FIG. 3), the extension line A2 coincides with the line B1 that means after carrying out the deuterium treatment. This means that, it can be assumed that the loss after carrying out the deuterium treatment (loss after NBOHC is extinguished) is substantially the loss due to Rayleigh scattering in the short-wavelength band.

Conversely, it can be assumed that the difference ΔP between the lines A2 and B1 and the line A1 is the loss which is caused by NBOHC. That is, by removing the difference ΔP representing the loss from in FIG. 3, the difference ΔP can be shown in FIG. 4. The difference ΔP shows the peak thereof near 630 nm. It is simply apparent that the difference ΔP substantially corresponds to the absorption loss due to NBOHC. Because of this, it is possible to calculate the amount of NBOHC by determining the difference ΔP between the line A1 and the line A2 or between the line A1 and the line B1 at 630 nm ($\lambda^{-4}$ is approximately 6.35 $\mu m^{-4}$).

Here, since the lines A2 and B1 substantially overlap each other in the region in which $\lambda^{-4}=1$ to 4 $\mu m^{-4}$, it is possible to estimate the line B1 shown in FIG. 3 at the time of measuring only the loss characteristics (the line A0 shown in FIG. 3) before carrying out the deuterium treatment.

As described above, as a result of measuring the loss at the short-wavelength (the line A0 shown in FIG. 2) before carrying out the deuterium treatment, it is possible to estimate the loss at the short-wavelength (the line B1 shown in FIG. 3) after carrying out the deuterium treatment, it is possible to estimate the amount of NBOHC from the above-mentioned difference ΔP. This means that it is possible to estimate the amount of NBOHC (the amount of NBOHC in the core) in the step before carrying out the deuterium treatment (in the step in which the deuterium treatment is not practically carried out) (first process S011). Furthermore, the amount of deuterium required for changing the estimated total amount of NBOHC into an —OD group is determined (second process S012). Eventually, by only carrying out the measurement before carrying out the deuterium treatment, it is possible to estimate the required amount of deuterium.

Particularly, in the explanation with reference to FIGS. 2 and 3, as an example, the absorption peak due to NBOHC is 630 nm. It is envisioned that a loss due to Rayleigh scattering occurs in the wavelength region ($\lambda^{-4}=1$ to 4 $\mu m^{-4}$) that is located at the long-wavelength side longer than the wavelength region ($\lambda^{-4}=4$ to 8 $\mu m^{-4}$) including the absorption peak wavelength, the loss data in the wavelength region ($\lambda^{-4}=1$ to 4 $\mu m^{-4}$) is used for linear approximation. However, the wavelength region used for the linear approximation is not limited to the above-mentioned example. The wavelength region used for the linear approximation is not limited to the wavelength region of $\lambda^{-4}=1$ to 4 $\mu m^{-4}$, as long as the wavelength region used for the linear approximation is a region where absorption due to NBOHC does not occur, is a region which is estimated such that a loss due to Rayleigh scattering only occurs, and is a region in which variation in loss data is small to the extent that linear approximation can be carried out. For example, the wavelength region of $\lambda^{-4}=2$ to 4 $\mu m^{-4}$ or the wavelength region wavelength region of $\lambda^{-4}=1$ to 3 $\mu m^{-4}$ may be used. Practically, depending on the number of data samples, as long as $\lambda^{-4}$ is less than or equal to 4 $\mu m^{-4}$ and the wavelength region including the region including at least the range of 2 to 3 $\mu m^{-4}$ is used, it is confirmed that a significant error does not occur in the aforementioned linear approximation.

That is, basically, as described in the above aspect, before an air-atmosphere exposure step (oxygen-bridging-element including gas exposure step) is carried out, a transmission loss of the optical fiber is measured and transmission loss measurement data is thereby obtained. Of the obtained transmission loss measurement data, data of the wavelength region which avoids the absorption peak due to NBOHC is externally fitted on the wavelength region in which the absorption peak exists, and a transmission loss due to NBOHC at the absorption peak due to NBOHC is determined. Based on the transmission loss, it is possible to estimate the amount of NBOHC in the core.

Therefore, as one of specific examples, when the measurement data associated with a short-wavelength λ with respect to a transmission loss in which the wavelength λ of the optical fiber is less than or equal to 1000 nm is converted into $\lambda^{-4}$ (unit: μm), the loss data of a wavelength region including a region other than a wavelength region in which $\lambda^{-4}$ is 4 to 8 and including at least a region in which $\lambda^{-4}$ is 2 to 3 is subjected to linear approximation, the difference between a transmission loss value of 630 nm on an extension line of the approximation straight line and a practically-measured transmission loss value of 630 nm is defined as a transmission loss due to the Non-Bridging Oxygen Hole Centers, and the amount of Non-Bridging Oxygen Hole Centers in the core can be estimated based on the transmission loss as described in the above aspect.

Figure 4:
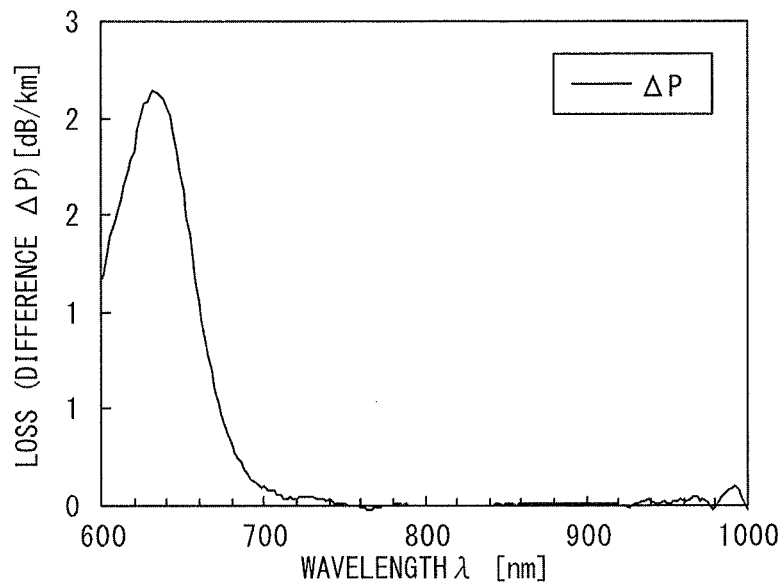
FIG. 4 is a chart showing the first process S011 of the first step S01 in the atmosphere exposure condition determination step S0 in the embodiment of the invention and showing a loss except for a loss due to Rayleigh scattering (it is assumed that the loss occurs due to NBOHC).

Here, the optical fiber includes the core and the cladding that surrounds the core. Therefore, since NBOHC exists not only in the core region but also in the cladding region, when the optical fiber is subjected to the deuterium treatment, part of deuterium that is infiltrated into the optical fiber is consumed in order to convert NBOHC in the cladding region into a —OD group. In contrast, the estimation which is explained with reference to FIGS. 2 to 4 is carried out based on the transmission loss that is measured by passing light through the core region, that is, based on the transmission loss of the core region. This means that, the amount of deuterium estimated by the aforementioned estimation is only the amount of deuterium of the core region. Accordingly, in order to apply the aforementioned estimation to a practical optical fiber, the amount of deuterium that is consumed in the cladding region should be also estimated. Particularly, in order to estimate the amount of deuterium necessary for the entire optical fiber, it is necessary to determine the total of the amount of deuterium (the amount of deuterium necessary for the core region) obtained by the above-mentioned estimation and the amount of deuterium necessary for the cladding region.

Based on the inventor's experience of many years and past results, the inventor has knowledge that the amount of NBOHC in the entire optical fiber including the cladding region can be estimated from the amount of NBOHC of the core region. Next, the knowledge will be described.

Regarding a plurality of optical fibers manufactured by the same manufacturing processes and the same conditions of manufacture, that is, a plurality of optical fibers which can be predicted to have variation in the ratio of the amount of NBOHC of the core region to the amount of NBOHC of the cladding region, the inventor carried out experiments in which the entire optical fibers are subjected to an air atmosphere after the entire optical fibers are exposed to an atmosphere including deuterium, and examined a required air-atmosphere-exposure time until the deuterium treatment is completed in each experiment. Here, the experiments are carried out in the same condition in which the optical fiber is exposed to deuterium, the concentration of deuterium is 2 vol %, a deuterium exposure time is 3 hours, deuterium exposure temperature is a room temperature (23° C.). Moreover, regarding the required time until the deuterium treatment is completed, the air-atmosphere-exposure time variously varies in the same optical fiber, and a loss at the short-wavelength thereof is continuously measured. Based on this measurement, the relationship between the exposure time and the amount of NBOHC remaining in the entire optical fiber is examined, and the time until the amount of NBOHC in the entire optical fiber substantially becomes zero is defined as an air-atmosphere-exposure time that is required to complete the deuterium treatment.

On the other hand, the inventor separately examined the value of a loss at 630 nm (peak loss, the loss is obtained by subtracting the difference of the loss due to Rayleigh scattering from a loss, that is, the loss of the core region due to NBOHC at the peak at 630 nm of ΔP shown in FIGS. 3 and 4, and the value that can be measured before the deuterium treatment) in the optical fibers used in the aforementioned experiments of the deuterium exposure and the air atmosphere exposure. In the aforementioned experiments of the deuterium exposure and the air atmosphere exposure, the inventor marshals the relationship between the air-atmosphere-exposure time that is required to complete the deuterium treatment in the entire optical fiber and the peak loss of the core region due to NBOHC, and results are obtained as shown in FIG. 5.

Figure 5:
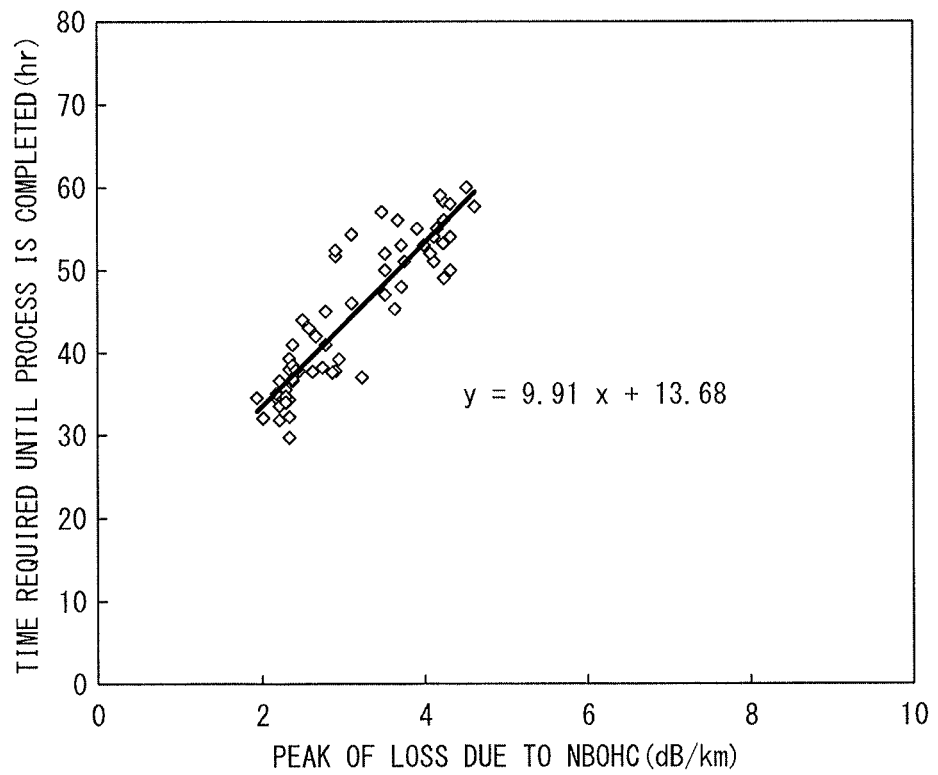
FIG. 5 is a chart showing a second process S012 of the first step S01 in the atmosphere exposure condition determination step S0 in the embodiment of the invention and showing the correlation between the peak of the loss of core due to NBOHC and cumulative result data of the required time in the case where the entire optical fiber is subjected to an air atmosphere.

It is understood from FIG. 5 that, the air-atmosphere-exposure time that is required to complete the deuterium treatment in the entire optical fiber is correlated to the peak loss of the core region due to NBOHC (constant correlation). Particularly, in the example shown in FIG. 5, the correlation is shown which is substantially along the linear function expressed by y=9.91x+13.68 where the peak loss (dB/km) of the core region due to NBOHC is represented as x and the air-atmosphere-exposure time that is required to complete the deuterium treatment in the entire optical fiber is represented as y (hours).

Here, the y-axis of FIG. 5 (the air-atmosphere-exposure time that is required to complete the deuterium treatment in the entire optical fiber) corresponds to the amount of NBOHC in the entire optical fiber including the core region and the cladding region. The x-axis of FIG. 5 (the peak loss of the core region due to NBOHC) corresponds to the amount of NBOHC of the core region.

As mentioned above, since the embodiment of the invention provides a constant correlation between the air-atmosphere-exposure time and the peak loss of the core region, the air-atmosphere-exposure time is correlated to the peak loss of the core region, it is possible to say that the amount of NBOHC of the core region is correlated to the amount of NBOHC of the cladding region. This means that, in the optical fibers manufactured by practical stable manufacturing steps in the same manufacturing processes and the same conditions of manufacture, variation in the ratio of the amount of NBOHC of the core region to the amount of NBOHC of the cladding region is small and is comparatively stable. Furthermore, as a result of weighting the amount of NBOHC of the cladding region to the amount of NBOHC of the core region (the amount thereof can be estimated by measurement before carrying out the deuterium treatment) based on the above-described correlation, it is determined that the amount of NBOHC of the entire optical fiber can be estimated (third process S013).

Consequently, in the case where result data in previous cases which is associated with a plurality of optical fibers manufactured by the same manufacturing processes and the same conditions of manufacture is accumulated, the correlation function is statistically determined in advance based on the data; on the other hand, the amount of NBOHC of the core region of an optical fiber that is to be subjected to deuterium treatment is measured, weighting is carried out to the value based on the correlation function, and the amount of NBOHC of the entire optical fiber can be thereby estimated.

In the case where the above-described embodiment of the invention is summarized, in the first step S01 of the atmosphere exposure condition determination step S0, the processes "measurement of a loss at the short-wavelength before carrying out the deuterium treatment", "estimation of the loss due to Rayleigh scattering (which is equal to the loss at the short-wavelength after carrying out the deuterium treatment)", "estimation of the excessive loss (lost at 630 nm) at the NBOHC absorption peak (=estimation of the amount of NBOHC of the core region), "weighting based on statistically-determined correlation", and "estimation of the amount of NBOHC in the entire optical fiber" are carried out in this order. According to this process flow, it is possible to estimate the amount of deuterium that is required to completely process the entire optical fiber before carrying out the deuterium treatment.

In this manner described above, in the case where several result data obtained by carrying out the deuterium treatment of the optical fibers that are manufactured by the same processes and the same condition of manufacture is prepared in advance, it is possible to estimate the conditions under which the deuterium treatment is preferably carried out by only measuring a loss at the short-wavelength before the deuterium treatment. Additionally, in the case of continuously manufacturing the optical fiber by the same processes and the same condition of manufacture, a degree of accuracy of estimation is further improved by carrying out the feedback of the aforementioned data.

(Second Step S02 of Determining the Correlation Between the Temperature and the Time in which Optical Fiber is Subjected to Air and the Amount of Deuterium Based on a Diffusion Model)

In the case where the amount of NBOHC in the entire optical fiber is estimated in the first step S01 of the atmosphere exposure condition determination step S0 as mentioned above, the correlation between the temperature and the length of time in the air-atmosphere exposure period regarding the deuterium supplied to the optical fiber and the amount of the oxygen bridging element in the optical fiber is subsequently determined based on the diffusion model of the gaseous molecules in the cylindrical coordinate system (second step S02).

Firstly, the understanding of a state where deuterium is diffused in the optical fiber when the optical fiber is exposed to the atmosphere including deuterium will be described.

<Understanding of a State where Deuterium is Diffused in the Optical Fiber Using a Deuterium Diffusion Model>

Generally, in deuterium treatment, deuterium is infiltrated from the outer peripheral face of the optical fiber toward the inside thereof, and the treatment is thereby completed. It is thought that the infiltration state of the deuterium at this time can be shown using the diffusion model of the gaseous molecules in the cylindrical coordinate system. That is, the diffusion model in which the gaseous molecules are diffused from the outer peripheral face (cylindrical surface) of the optical fiber toward the inside thereof can be expressed by the following Formulas 1 and 2 based on the diffusion model of the gaseous molecules in the cylindrical coordinate system.

(Formula 1)

$$C(r, t) = C_0\left[1 - \sum_{n=1}^{\infty} B_n J_0(j_n r/b) \times \exp(-j_n^2 D(T)t/b^2)\right] \quad (1)$$

$$B_n \equiv 2/(j_n J_1(j_n)) \quad (2)$$

Jn: n-th degree Bessel function
jn: zero point of n-th in $J_0(j)$
$D(T)$: diffusion factor at $T(cm^2/s)$
T: temperature (K)
r: position in optical fiber radial direction (cm)
t: time (s)
b: external radius of optical fiber (cm)
$C_0$: initial concentration of diffuse gas (%)

Here, C(r, t) by represented by Formula 1 is the concentration of the diffusion gas (%) at radius r in position and time t when the gas is diffused into the cylindrical body from the outer peripheral face thereof.

Particularly, in the case where the kind of diffusion gas is determined, based on the following Formula 2, the diffusion factor D(T) is unambiguously determined as the characteristic number of the diffusion gas.

(Formula 2)

$$D(T)=D_0 T \exp(-E_d/RT) \quad (2)$$

$D_0$: diffusion constant $(cm^2/s)$ $E_d$: activation energy $(Jmol^{-1})$ R: gas constant $(JK^{-1} mol^{-1})$ That is, all of the gas constant $R_0$ of deuterium, the activation energy $E_d$, and diffusion constant $D_0$ in the case where the diffusion gas is deuterium are known. Specifically, the gas constant of deuterium $R_0$ is 8.31 J/K·mol, the activation energy $E_d$ is 8.8 kcal/mol, and the diffusion constant $D_0$ is approximately $1.5 \times 10^{-7}$ $cm^2/s$. Based on these values, D(T) at temperature T is unambiguously defined. Subsequently, in the case where the temperature T, the time t, and the concentration $C_0$ of deuterium in the atmosphere are determined when the optical fiber having a radius of r is exposed to the atmosphere including deuterium, it is possible to determine the concentration of deuterium at a point in time and at a position in the radial direction of the optical fiber.

Here, variation in the concentration of deuterium in the center position of the optical fiber (r=0) is obtained.

Figure 6:
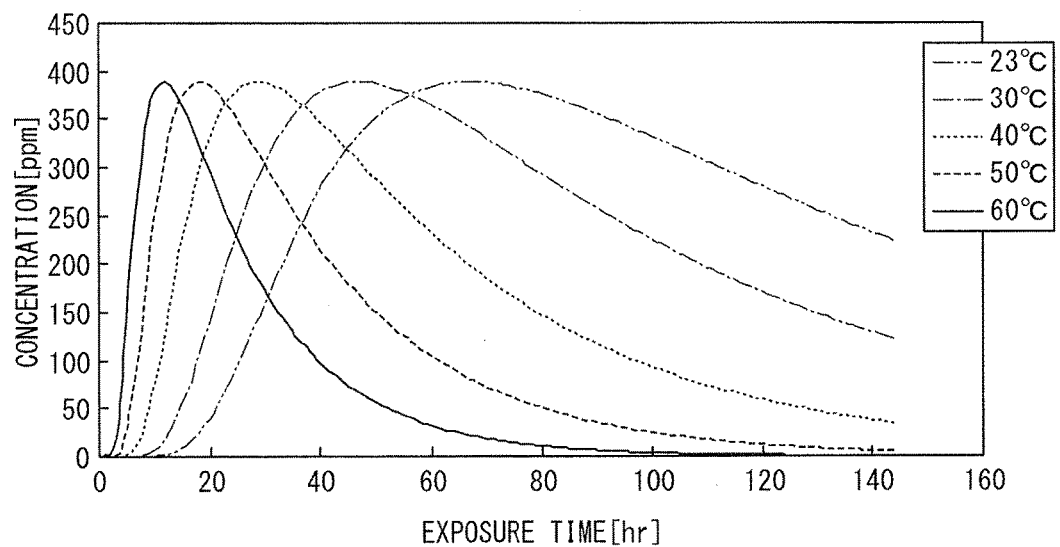
FIG. 6 is a chart showing a second step S02 in the atmosphere exposure condition determination step S0 in the embodiment of the invention and showing the relationship between the time in which an optical fiber is subjected to air at each temperature based on a diffusion model of gaseous molecules and the concentration of deuterium in the center of the optical fiber.

Particularly, regarding the optical fiber having the outer diameter of, for example, 125 μm, the optical fibers are subjected to the gas including deuterium having the partial pressure of 0.02 atm at a room temperature (23° C.) (component other than deuterium is substantially air) for 3 hours. Thereafter, the optical fibers are subjected to air at various temperatures, and variations in the concentration of deuterium in the center of the optical fiber are examined based on the aforementioned diffusion model. The results are shown in FIG. 6. Here, simple optical fibers having a core region located at the center of the optical fiber and a core region surrounding the core region are used. The radius of the core region is 5 μm. The x-axis of FIG. 6 represents the elapsed time after starting of exposure of the optical fiber to the air atmosphere after completion of exposure of the optical fiber to the above-described deuterium-including gas.

As shown in FIG. 6, it is understood that, as the temperature at which the optical fiber is exposed to air becomes higher, the deuterium is quickly diffused in the optical fiber. Consequently, as the ambient temperature becomes higher, the time at which the amount of deuterium supplied to the center of the optical fiber reaches the peak becomes earlier. It is also understood that the amount of deuterium that can be supplied to the center of the optical fiber quickly decreases. Moreover, the peak levels of the amount of deuterium shown in FIG. 6 are the same as each other at all temperatures. The reason is that, the deuterium distribution in the optical fiber does not vary at the time of completion of the deuterium exposure of the optical fiber. For this reason, the variation in air-atmosphere-exposure temperature only causes the effect of speeding up the diffusion rate of deuterium, and it is possible to say that the instantaneous maximum concentration cannot be changed at each temperature.

Figure 7:
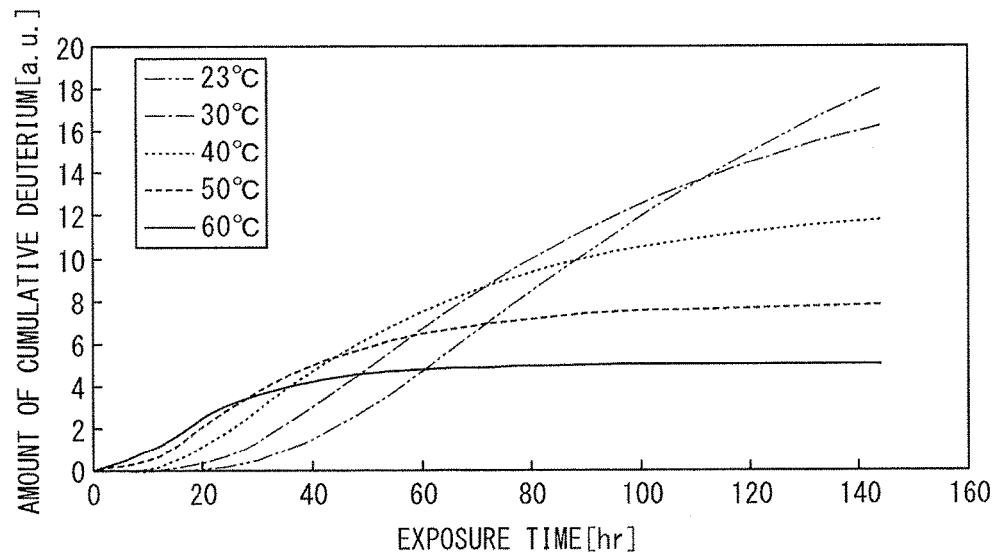
FIG. 7 is a chart showing the second step S02 in the atmosphere exposure condition determination step S0 in the embodiment of the invention and showing the chart in which variation in the concentration of deuterium shown in FIG. 6 is temporally integrated.

In consideration of a practical deuterium treatment model, the instantaneous amount of deuterium is not important, and it is essential to the amount of deuterium that moves in the direction of the center of the optical fiber in the total time. FIG. 7 shows that the variation in the concentration of deuterium shown in the graph of FIG. 6 is temporally integrated, and the y-axis of FIG. 7 indicates the value of integral (cumulative concentration of deuterium) which are obtained by the above time integration. Additionally, FIG. 8 is an enlarged chart and shows the short time area of the exposure time shown in FIG. 7.

Figure 8:
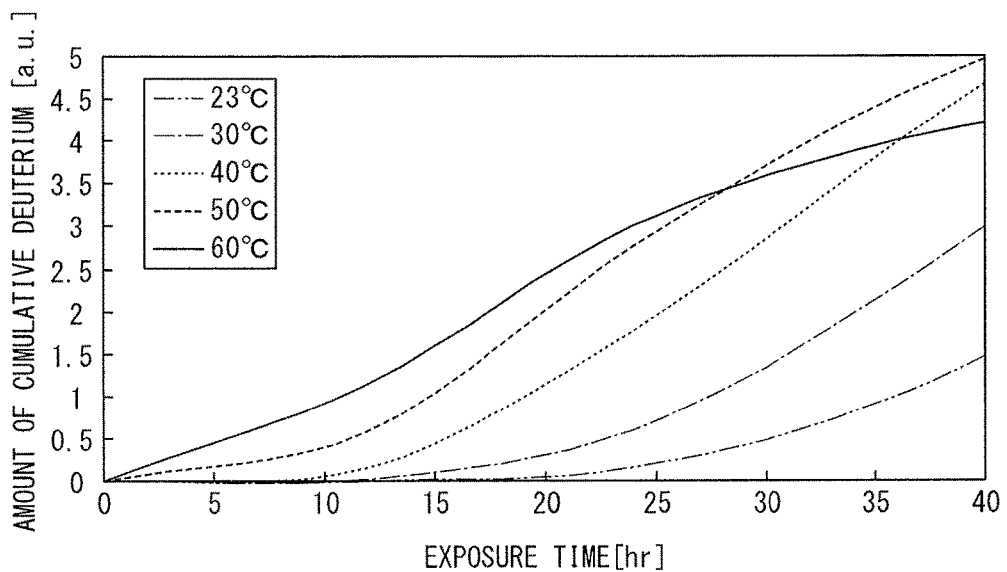
FIG. 8 is a chart showing the second step S02 in the atmosphere exposure condition determination step S0 in the embodiment of the invention and showing the chart obtained by partially-enlarging FIG. 7.

It can be assumed that the cumulative concentration of deuterium shown in the y-axes of FIGS. 7 and 8 is the amount of deuterium that moves in the direction to the center of the optical fiber in the optical fiber (the amount of deuterium that reaches the center of the optical fiber through the cladding region from the outside). As shown in FIGS. 7 and 8, the curved lines indicating the cumulative concentrations of deuterium which vary depending on the air-atmosphere exposure time are definitely different from each other in accordance with the air-atmosphere exposure temperature. Particularly, in the region in which the air-atmosphere exposure time is relatively short, as the temperature becomes higher, the cumulative amount of deuterium gradually increases. Conversely, in the region in which the air-atmosphere exposure time is relatively long, as the temperature becomes higher, the cumulative amount of deuterium gradually decreases. It is considered that the reason why such characteristics are obtained is as follows.

As the temperature becomes higher, the rate of diffusion increases. This means that not only the rate of diffusion in the direction of the center of the optical fiber but also the rate of diffusion in the outer direction thereof increases. For this reason, as the temperature becomes higher, the amount of deuterium that is diffused to the outside of the optical fiber and moves toward the outside thereof increases in the same time. Therefore, in the region in which the air-atmosphere exposure time is long, as the ambient temperature becomes higher, the amount of deuterium that can be supplied to the optical the center of the optical fiber decreases.

Figure 9:
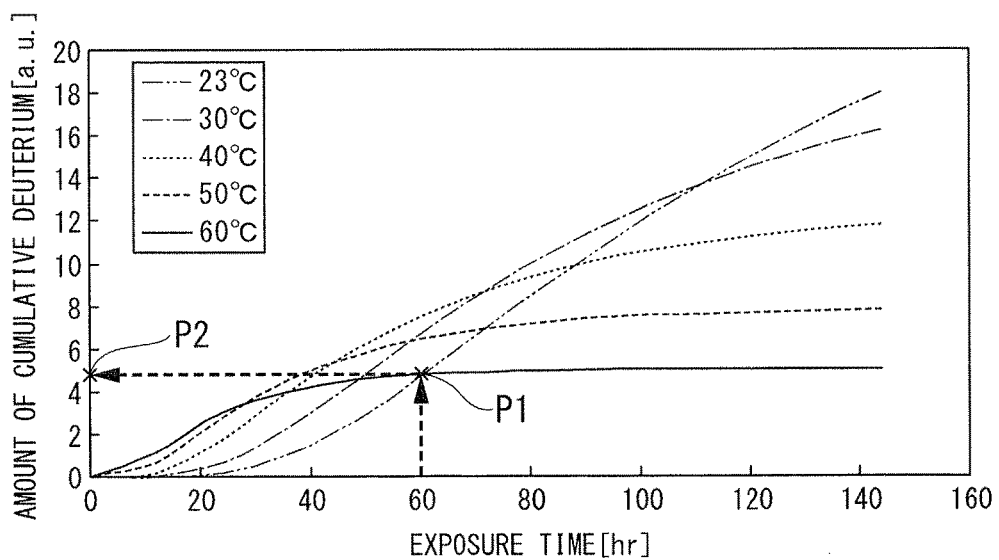
FIG. 9 is a chart showing the second step S02 in the atmosphere exposure condition determination step S0 in the embodiment of the invention and showing the chart of FIG. 7 in which a first process is written in order to estimate the optimal temperature at which the optical fiber is subjected to air.
Figure 10:
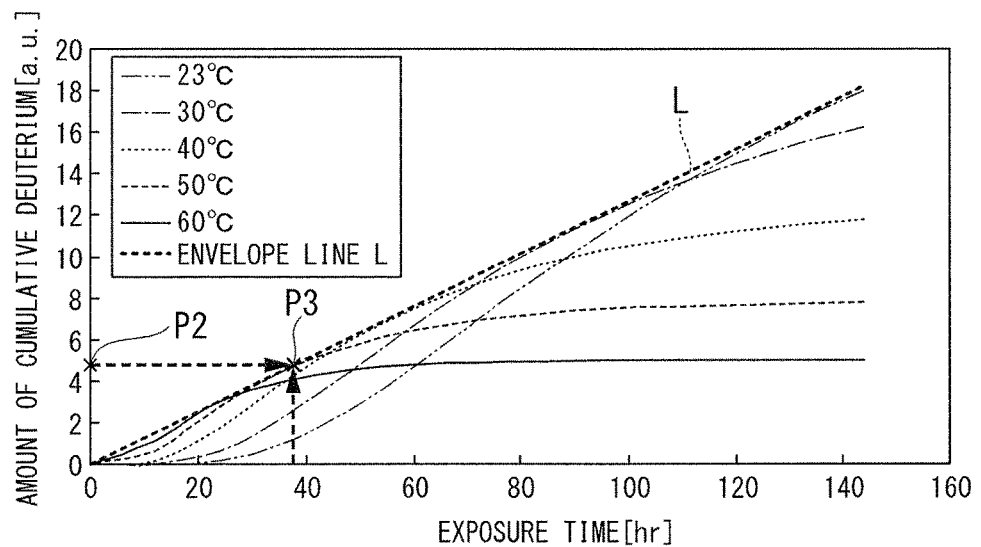
FIG. 10 is a chart showing the second step S02 in the atmosphere exposure condition determination step S0 in the embodiment of the invention and showing the chart of FIG. 7 in which a second process is written in order to estimate the optimal temperature at which the optical fiber is subjected to air.

Because of this, it is apparent from the charts of FIGS. 7 and 8 that, the optimal time corresponding to the air-atmosphere-exposure temperature can be determined as the air-atmosphere-exposure time in which it is possible to complete to introduce, into the optical fiber, the deuterium having the amount corresponding to the amount of NBOHC in the optical fiber in the shortest time. Next, the method of determining the optimal temperature and time using the charts shown in FIGS. 7 and 8 will be described with reference to FIGS. 9 and 10. The curved lines representing the relationship between the cumulative amount of deuterium, the air-atmosphere-exposure time at each temperature which are shown in FIGS. 9 and 10 are the same as that in FIG. 7. Reference signs, arrowed lines, and an envelope line used for explanation are written in FIGS. 9 and 10.

Based on measurement result data in previous cases which is associated with losses at the short-wavelength, it is possible to previously know how long (hours) does it need to carry out the air-atmosphere exposure at the general air-atmosphere-exposure temperature (in the embodiment, at a room temperature (23° C.). For example, it was supposed to take 60 hours at 23° C. In this case, based on P1 that is located at the exposure time of 60 on the curved line of the temperature of 23° C. shown in FIG. 9, it is understood that the necessary amount P2 of deuterium is obtained.

On the other hand, the envelope line L based on the temperature curves shown in FIG. 7 is written in FIG. 10. The envelope line L represents the exposure time in which each amount of deuterium can be supplied to the optical fiber at the quickest time (shortest exposure time) in the case where the air-atmosphere-exposure temperature continuously varies. For example, P3 that is on the envelope line L and corresponds to the aforementioned necessary amount of deuterium P2 is determined. Subsequently, a degree of temperature corresponding to P3 is determined. In this example, P3 corresponds to the temperature of approximately 50° C. on the envelope line L and the exposure time therefor corresponds to approximately 38 hours.

For this reason, it is possible to say that, as a result of causing the optical fiber to be subjected to the air atmosphere at 50° C., the deuterium treatment of the optical fiber can be completed by the processing for approximately 38 hours of the air-atmosphere exposure time, which is not 60 hours exposure at 23° C. based on the result data in previous cases. That is, based on the result data in previous cases, 60 hours at 23° C. is required to process the optical fiber by exposure. However, in the embodiment, as a result of causing the optical fiber that is the same as the above (that is, the necessary amount of deuterium is the same as the above) to be subjected to the exposure at 50° C., it is possible to shorten the exposure time to be 38 hours.

Particularly, in the aforementioned explanation, in order to facilitate understanding of the embodiment, the optimal temperature is determined on the charts shown in FIGS. 7, 9, and 10. The formula of the envelope line L can be determined by numerical analysis based on numerical values or numerical formulas at temperatures in order to draw the lines to make FIG. 7, and the optimal temperature can be analytically determined based on the determined formula. When the method according to the embodiment of the invention is applied to a practical case, it is preferable to determine the optimal temperature by numerical analysis.

(Deuterium-Including Gas Exposure Step S1)

In the atmosphere exposure condition determination step S0 which is carried out in advance as described above, the optimal temperature and the exposure time corresponding thereto which are used in the diffusion step by air-atmosphere exposure regarding an optical fiber are determined. Thereafter, actual deuterium treatment with respect to the optical fiber is started. That is, the deuterium-including gas exposure step S1 is carried out.

Figure 11:
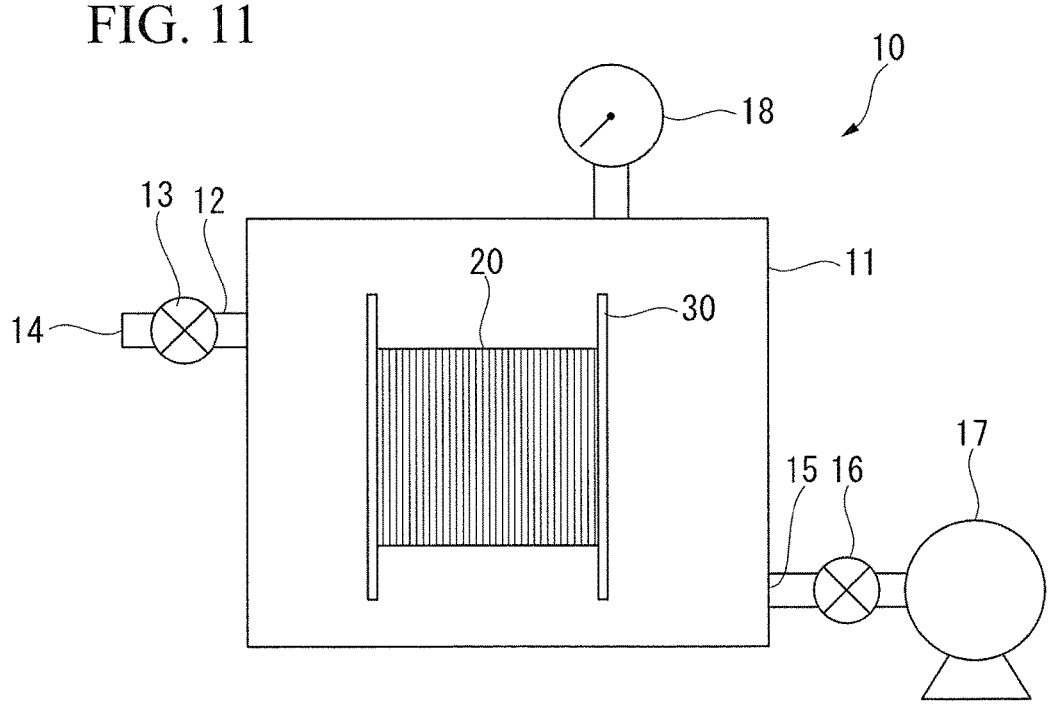
FIG. 11 is a schematic view showing a processing apparatus that carries out a deuterium-including gas exposure step of the method of processing the optical fiber according to the embodiment of the invention.

The deuterium-including gas exposure step S1 is a step of causing the optical fiber to be subjected to a gas atmosphere including deuterium and allowing the deuterium to be infiltrated (infiltration) into the inside of the optical fiber from the outside thereof. FIG. 11 shows an example of a processing apparatus used in the deuterium-including gas exposure step S1.

In FIG. 11, reference numeral 10 represents a processing apparatus used to cause the optical fiber to be exposed to the gas including deuterium. Reference numeral 11 represents a reactor (processing chamber). Reference numeral 12 represents a gas introduction port. Reference numeral 13 represents a gas introduction valve. Reference numeral 14 represents a gas supply pipe. Reference numeral 15 represents an exhaust port. Reference numeral 16 represents a discharge valve. Reference numeral 17 represents a discharge pump. Reference numeral 18 represents a differential-pressure meter. Reference numeral 20 represents an optical fiber to be processed. Reference numeral 30 represents a bobbin.

The reactor 11 of the processing apparatus 10 is a hermetically-sealed chamber that can accommodate the optical fiber 20 therein and has pressure resistance or sealing performance such that it is possible to resist a vacuum state such as being approximately 0.1 kPa or a pressurized state such as being approximately from ordinary pressure to 250 kPa or less. The gas supply pipe 14 is connected to the gas introduction port 12 of the reactor 11 via the gas introduction valve 13. It is possible to supply the gas including deuterium to the reactor 11 from the gas supply pipe 14.

The conditions in the deuterium-including gas exposure step is not particularly limited and may be suitably determined depending on the result data in previous cases so that deuterium can be sufficiently infiltrated into the optical fiber depending on the kind of optical fiber, the configuration thereof, the diameter thereof, or the like. Generally, it is preferable to carry out the deuterium-including gas exposure step under the following conditions.

Particularly, as the gas including deuterium, it is preferable to use a gas including deuterium of approximately 1 to 5% added into a neutral gas such as air or nitrogen. Regarding the exposure temperature, as the temperature becomes higher, the exposure time decreases. In terms of cost, generally, it is sufficient that the exposure temperature is a room temperature (for example, approximately 23° C.). The exposure time varies depending on a state of the optical fiber or the diameter thereof during the exposure. In the case of a commonly-used optical fiber having a glass diameter of 125 µm, the exposure time is approximately 3 to 48 hours. Furthermore, a gas pressure during the exposure is not particularly limited. Generally, it is sufficient that the gas pressure is an atmospheric pressure in total pressure.

(Diffusion Step (Air-Atmosphere Exposure) S2)

After the deuterium-including gas exposure step, air-atmosphere exposure is immediately carried out as a diffusion step S2. As a result of the air-atmosphere exposure, deuterium that is infiltrated into the optical fiber is diffused therein, the optical fiber is in a state where the deuterium is sufficiently supplied so as to reach the central part (core center). Subsequently, NBOHC in the center of the optical fiber is also treated by the deuterium, NBOHC absorption peak near 630 nm is extinguished. Thereafter, it is possible to prevent a transmission loss from being degraded due to hydrogen absorption near 1383 nm during use of the optical fiber product provided with the above optical fiber. Consequently, regarding a commonly-used optical fiber for communication having a transmission band near 1383 nm, it is possible to improve the hydrogen characteristics thereof.

The ambient temperature in the air-atmosphere exposure is adjusted to be the temperature that is described above and is determined by the atmosphere exposure condition determination step. Furthermore, the air-atmosphere-exposure time is determined as the exposure time that corresponds to the temperature in the atmosphere exposure condition determination step that is the same as the above. Generally, in the atmosphere exposure condition determination step, the optimal temperature is determined in advance so as to determine the shortest time that is required to maintain, in the optical fiber, the necessary amount of deuterium at the time immediately after the air-atmosphere exposure. Therefore, it is only necessary that the length of time of the air-atmosphere exposure is the above shortest time. However, the invention is not limited to this, in consideration of a slight margin to be added to the aforementioned shortest time, the air-atmosphere exposure may be carried out in the time slightly longer than the above shortest time.

After completion of the diffusion step (air-atmosphere exposure) S2 as described above, the deuterium treatment according to the embodiment is finished, and it is possible to ship out the optical fiber as an optical fiber product.

Particularly, in the embodiment, as a result of preliminarily determining the exposure temperature so that the length of time of the air-atmosphere exposure is determined to be the shortest time that is required to maintain, in the optical fiber, the necessary amount of deuterium at the time immediately after the air-atmosphere exposure, it is possible to avoid deuterium from excessively remaining in the optical fiber.

That is, since it is possible to estimate the necessary amount of deuterium in advance by use of the method of processing the optical fiber according to the embodiment of the invention, it is possible to carry out the treatment using the minimum amount of deuterium required for the deuterium exposure. In the case, it is possible to omit a degasification step (the step of removing excessive deuterium from the optical fiber) which is carried out after the air-atmosphere exposure (diffusion step). In some cases, the degasification step may be carried out after the air-atmosphere exposure.

In the above-mentioned embodiment, the non-oxygen bridging atmosphere that does not include the oxygen bridging element is an air atmosphere, and the optical fiber is subjected to air in the diffusion step. In short, in the diffusion step, it is only necessary that the optical fiber is subjected to the non-oxygen bridging atmosphere that does not include the oxygen bridging element, and the non-oxygen bridging atmosphere may be, for example, a nitrogen atmosphere.

(Embodiment Using Hydrogen Processing)

In the above-described embodiment, the case of particularly using deuterium of hydrogen isotope as the gas including the oxygen bridging element is explained. As described above, treatment using hydrogen instead of deuterium may be carried out with respect to special optical fibers, for example, optical fibers having the transmission band that is out of near 1383 nm, such as special-purpose optical fibers having a transmission band of near 600 nm. In this case, it is only necessary that the atmosphere exposure condition determination step, a hydrogen-including gas exposure step, the diffusion step (air-atmosphere exposure) are carried out in the same way as the above-described treatment using deuterium. Additionally, it is possible to read the above description while replacing the deuterium described in the above-mentioned steps with hydrogen, and the explanation in the case of using the hydrogen processing is omitted.

However, in the second step of the atmosphere exposure condition determination step (the step of determining the correlation between the temperature and the time in which the optical fiber is subjected to air, and the amount of hydrogen in the optical fiber based on a diffusion model of gaseous molecules using the cylindrical coordinate system), as the diffusion model of gaseous molecules, it is necessary to use a model based on hydrogen (dispersive equation) without using the model based on deuterium. In this case, in the above described Formulas 1 and 2 regarding the cylindrical coordinate system diffusion model of gaseous molecules, it is only necessary that, the value of approximately 8.31 J/K·mol is used as the gas constant $R_0$, the value of approximately 8.83 kcal/mol is used as the activation energy $E_a$, the value of approximately $2.0 \times 10^{-7}$ cm$^2$/s is used as the diffusion constant $D_0$.

In the case of carrying out the hydrogen processing as mentioned above, NBOHC in the center of the optical fiber is also treated by the hydrogen (that is, Si—O. of NBOHC becomes Si—OH), NBOHC absorption peak near 630 nm is extinguished in the same way as the case of the deuterium treatment. However, in this case, since the absorption peak after hydrogen bonding is 1383 nm, the optical fiber processed by the above steps is not suitable to a commonly-used optical fiber using a wavelength of near 1383 nm as a transmission band. Regarding the optical fiber having a transmission band different from the wavelength of near 1383 nm, it is possible to prevent a long-term transmission loss of the optical fiber from being degraded due to hydrogen absorption during use of the optical fiber product provided with the above optical fiber after completion of the above steps.

Particularly, in the above-described embodiment, the hydrogen characteristics of the optical fiber are prevented from being degraded due to NBOHC by the optical fiber processing method before the deterioration thereof. The method carries out: the atmosphere exposure condition determination step S0 including the first step S01 of estimating the needed amount (for example, required amount of deuterium) of the oxygen bridging element to be infiltrated into the entire optical fiber; the step of causing the optical fiber to be subjected to the gas including deuterium (oxygen-bridging-element including gas exposure step, for example, the deuterium-including gas exposure step S1); and the diffusion step S2 of continuously causing the optical fiber to be subjected to air, for example, diffusing deuterium in the optical fiber in this order. However, in some cases, the first step S01 of estimating the needed amount (for example, required amount of deuterium) of the oxygen bridging element to be infiltrated into the entire optical fiber may be extracted from the above steps and the first step S01 may be only carried out. That is, the first step S01 is separated from the step of causing the optical fiber to be exposed to the gas including deuterium (oxygen-bridging-element including gas exposure step, for example, the deuterium-including gas exposure step S1) and from the diffusion step S2. The first step S01 may be independently carried out in order to estimate the amount of deuterium or hydrogen which is required for processing the entire NBOHC amount of a predetermined optical fiber.

On the other hand, as a technique of measuring the amount of NBOHC of the entire optical fiber, not only the methods in the above-descried embodiment but also a method using ESR (electron spin resonance) is known. This method utilizes the principle that unpaired electrons absorb a specific micro wave and thereby transits to a higher energy level, detects a free radical by applying a magnetic field to the optical fiber from the outside of the optical fiber, can measure the amount of NBOHC serving as radical defects. Therefore, the amount of NBOHC in the entire optical fiber is estimated by use of the above described method, and the necessary amount of deuterium or the necessary amount of hydrogen may be estimated based on the estimation results.

However, in the estimation method utilizing the above-described ESR (electron spin resonance), a specific and expensive measurement apparatus is necessary. In contrast, according to the method of estimating the amount of NBOHC in the entire optical fiber described in the embodiment, a specific apparatus is not necessary, the amount of NBOHC can be estimated only using a short wavelength light source and a spectrum analyzer, and therefore, there is an advantage in that the estimation of the amount of NBOHC can be simply and easily carried out at a low cost.

Subsequently, Examples of the method of processing the optical fiber of the invention will be described.

EXAMPLES

Example 1

In Example 1, deuterium is used as an oxygen bridging element.

An optical fiber preform which is made of silica-based glass and is formed by using a vapor-phase axial deposition method and an outside vapor deposition method was subjected to fiber drawing, the drawn fiber was coated with a resin coating made of a ultraviolet curable resin, and therefore a single-mode optical fiber having a glass diameter of 125 μm, a coating diameter of 250 μm, and a length of 50 km was manufactured. The core diameter of the optical fiber was 10 μm. From the optical fiber, a 1 km-length optical fiber was extracted, and the loss characteristics thereof were examined using a short wavelength light source and a spectrum analyzer. A loss at the short-wavelength at wavelengths of 600 nm to 1000 nm was measured and the results shown in the solid line A0 in FIG. 2 was obtained.

The measurement result indicated by the solid line A0 shown in FIG. 2 includes both a loss due to Rayleigh scattering and an absorption loss due to NBOHC. Next, the measurement result ($\lambda$) indicated by the solid line A0 shown in FIG. 2 is converted into $\lambda^{-4}$ and the converted result is indicated by the solid line A1 shown in FIG. 3.

Furthermore, the result that linear approximation is carried out in the range of $\lambda^{-4}=1$ to $4$ $\mu m^{-4}$ which is out of the range of the NBOHC absorption peak is indicated by the chain line A2 shown in FIG. 3a. The approximation straight line (chain line) A2 represents a loss due to Rayleigh scattering. Consequently, by determining the difference $\Delta P$ between A1 and A2, the absorption loss due to NBOHC can be only extracted. The difference $\Delta P$, that is the absorption loss of NBOHC is shown in FIG. 4. Here, a loss was 2.2 dB/km at the wavelength of 630 nm that is the absorption peak.

Here, FIG. 5 shows the correlation data between the absorption loss peak of NBOHC at 630 nm and the time required to complete the deuterium treatment, which are based on the result data of deuterium treatment regarding a plurality of optical fibers which are manufactured under the same condition. Particularly, the deuterium treatment result data is obtained based on the same deuterium treatment to which each optical fiber is subjected where the concentration of deuterium is 2% (component other than deuterium is air), the deuterium exposure time is 3 hours, and the deuterium exposure temperature is a room temperature (23° C.). In FIG. 5, the deuterium treatment result data is provided so that the air-atmosphere exposure time that is from after the completion of deuterium exposure to the completion of treatment is referred to as the time required to complete the deuterium treatment.

As shown in FIG. 5, the air-atmosphere-exposure time that is required to complete the deuterium treatment in the entire optical fiber is correlated to the peak loss of the core region due to NBOHC (constant correlation). Particularly, in the example shown in FIG. 5, the correlation is shown which is substantially along the linear function expressed by y=9.91x+13.68 where the peak loss (dB/km) of the core region due to NBOHC is represented as x and the air-atmosphere-exposure time that is required to complete the deuterium treatment in the entire optical fiber is represented as y (hours).

Accordingly, from the correlation shown in FIG. 5, it is possible to say that the amount of NBOHC of the core region is correlated to the amount of NBOHC of the cladding region. As a result of weighting the amount of NBOHC of the cladding region to the amount of NBOHC of the core region (the amount thereof can be estimated by measurement before carrying out the deuterium treatment) based on the above-described correlation, it is determined that the amount of NBOHC of the entire optical fiber can be estimated.

Up to this step in Example 1 corresponds to the estimation method of estimating the amount of NBOHC of the entire optical fiber according to the Example of the invention.

Particularly, based on the correlation between the absorption peak due to NBOHC and the time required to complete the processing (air-atmosphere-exposure time) shown in FIG. 5, the time required to carry out the air-atmosphere exposure in the case of causing the optical fiber to be subjected to the deuterium treatment under the same condition as the above was 35.5 hours by the estimation method.

Furthermore, in the case of actually causing the optical fiber to be subjected to the deuterium treatment under the conditions where the concentration is deuterium 2%, the deuterium exposure time is 3 hours, and the deuterium exposure temperature is a room temperature (23° C.), the time required for the air-atmosphere exposure was 35.9 hours. Consequently, it is obvious that, as a result of measuring a loss at the short-wavelength and comparing the measured data and the correlation of the result data, before carrying out the deuterium treatment, it is possible to estimate the time required to complete the deuterium treatment.

Here, FIG. 6 shows the results that the relationship between the air-atmosphere-exposure time and the concentration of deuterium in the center of the optical fiber after the deuterium treatment is carried out under the conditions where the concentration is deuterium 2%, the deuterium exposure time is 3 hours, and the deuterium exposure temperature is a room temperature (23° C.) is examined, which are based on the diffusion equation of Formulas 1 and 2.

As a result of carrying out temporal integration with respect to the results shown in FIG. 6 in order to determine the amount of deuterium that moves toward the center of the optical fiber in the entire exposure time, the results shown in FIG. 7 were obtained. FIG. 8 is a chart obtained by enlarging FIG. 7 and shows the time near 35.5 hours.

It is apparent from FIGS. 7 and 8 that it is effective to make the temperature higher in order to move the same amount of deuterium to the center of the optical fiber. Consequently, as a result of making the ambient temperature in the air-atmosphere exposure higher from 23° C. to 30° C. in accordance with the method shown in FIGS. 9 and 10, it was determined that the exposure time of 35.5 hours which is required for the exposure can be shortened to be 27 hours. In principle, as a result of making the temperature higher to be in the range of 70 to 80° C., it is apparent that the treatment can be completed in the shortest exposure time of 10 hours.

Therefore, in the Example, it was determined that the treatment is carried out so that the air-atmosphere-exposure temperature is 40° C. which is higher than a room temperature (23° C.) that is the air-atmosphere-exposure temperature and is conventionally and commonly used. In this case, it is assumed that the air-atmosphere-exposure time of 19 hours is sufficient.

The above-described step corresponds to the atmosphere exposure condition determination step S0 of the method of processing the optical fiber using deuterium of the Example of the invention.

Thereafter, the deuterium-including gas exposure step S1 was actually carried out with respect to the same optical fiber as the above under the conditions where the concentration is deuterium 2% (component other than deuterium is air), the deuterium exposure time is 3 hours, the deuterium exposure temperature is a room temperature (23° C.), and the ambient pressure is 1 atmosphere pressure. Immediately, the diffusion step S2 was carried out for the exposure time of 20 hours at the air-atmosphere-exposure ambient temperature of 40° C. determined as described above.

As a result, it was confirmed that the peak at 630 nm is not present, that is, NBOH can be substantially extinguished by the deuterium treatment of the Example of the invention. Furthermore, in the embodiment, the air-atmosphere-exposure time can be shortened by approximately 15 hours, it is apparent that the result that is preliminarily estimated is obtained.

It is apparent from the above-described Example that, in the case of carrying out the deuterium treatment, the air-atmosphere-exposure time can be shorter than ever before by suitably determining the air-atmosphere-exposure temperature of the diffusion step, and the total processing time can be shortened.

The preferred embodiments of the present invention have been described above. However, it should be noted that these embodiments are merely examples of the present invention and do not limit the present invention. Additions, omissions, substitutions, and other modifications can be made within a range not departing from the scope of the present invention. Accordingly, the present invention is not limited the above description and is only limited to claims.

What is claimed is:

1. A method of treating an optical fiber, comprising:
preparing an optical fiber that comprises a core and a cladding surrounding the core and that is made of a silica-based glass;
determining an exposure ambient temperature that causes the optical fiber to be subjected to a non-oxygen bridging atmosphere not including an oxygen bridging element by:
estimating an amount of Non-Bridging Oxygen Hole Centers (NBOHC) in the entire optical fiber based on a correlation between an amount of NBOHC in the entire optical fiber corresponding to previously manufactured optical fibers and an amount of NBOHC in the core, and based on an estimated amount of NBOHC in the core;
estimating an amount of the oxygen bridging element required for treating the NBOHC in the entire optical fiber based on the estimated amount of NBOHC in the entire optical fiber;
determining a correlation between an exposure ambient temperature, an exposure time, and the amount of the oxygen bridging element in the optical fiber, based on a diffusion model of gaseous molecules of an oxygen bridging element supplied to the optical fiber; and
then determining the exposure ambient temperature at which the optical fiber is subjected to the non-oxygen bridging atmosphere, based on the determined correlation, the exposure time, and the amount of oxygen bridging element in the optical fiber;
exposing the optical fiber to a gas including an oxygen bridging element that is capable of treating the NBOHC by being bonded to a non-bridging oxygen in the optical fiber, and causing the oxygen bridging element to infiltrate into the optical fiber; and
subsequently treating the optical fiber by subjecting the optical fiber to the non-oxygen bridging atmosphere with the determined exposure ambient temperature and thereby diffusing the oxygen bridging element into the optical fiber;
wherein the exposure time is estimated by:
estimating an NBOHC absorption loss in the core at a wavelength of near 630 nm by obtaining transmission loss measurement data of the optical fiber before the exposing of the optical fiber; and
determining the exposure time for the optical fiber based on a peak transmission loss from the estimating the NBOHC absorption loss and a correlation between the exposure time and the peak transmission loss at the wavelength of near 630 nm for a specific set of manufacturing conditions;
wherein the estimating the NBOHC absorption loss comprises:
externally fitting wavelength region data of the transmission loss measurement data, which avoids an absorption peak due to the NBOHC, at a wavelength region in which the absorption peak exists,
determining a transmission loss at the absorption peak due to the NBOHC, and
estimating the amount of NBOHC in the core based on the transmission loss at the absorption peak due to the NBOHC,
wherein the estimating the amount of NBOHC in the core is based on the transmission loss measurement data, which is associated with a short-wavelength $\lambda$ with respect to a transmission loss in which the wavelength $\lambda$ of the optical fiber is less than or equal to 1000 nm is converted into $\lambda^{-4}$, loss data of a wavelength region including a region other than a wavelength region in which $\lambda^{-4}$ is 4 to 8 and including at least a region in which $\lambda^{-4}$ is 2 to 3 that is subjected to linear approximation,
wherein a difference between a transmission loss value of near 630 nm on an extension line of the linear approximation and a measured transmission loss value of near 630 nm is defined as a transmission loss due to the NBOHC, and
wherein the amount of NBOHC in the core is estimated based on the transmission loss due to the NBOHC and a peak transmission loss of the core is determined due to the NBOHC.

2. The method according to claim 1, wherein
a gas including deuterium is used as the gas including the oxygen bridging element.

3. A method of treating an optical fiber, comprising:
preparing an optical fiber that comprises a core and a cladding surrounding the core and that is made of a silica-based glass;
obtaining transmission loss data by measuring a transmission loss of the optical fiber before exposing the optical fiber to a gas including an oxygen bridging element, and estimating Non-Bridging Oxygen Hole Centers (NBOHC) absorption loss in the core at the wavelength of near 630 nm by obtaining the transmission loss data;

estimating an amount of NBOHC in the entire optical fiber, based on a correlation between an amount of NBOHC in the entire optical fiber corresponding to previously manufactured optical fibers and an amount of NBOHC in the core, and based on an estimated amount of NBOHC in the core;

estimating an amount of the oxygen bridging element required for treating the NBOHC in the entire optical fiber based on the estimated amount of NBOHC in the entire optical fiber; and exposing the optical fiber to the gas including the oxygen bridging element that is capable of treating the NBOHC by being bonded to a non-bridging oxygen in the optical fiber, and treating the optical fiber by causing the oxygen bridging element to infiltrate into the optical fiber, wherein the estimating NBOHC absorption loss in the core comprises:

externally fitting wavelength region data of transmission loss measurement data obtained in advance by measuring a transmission loss of the optical fiber, which avoids an absorption peak due to the NBOHC, at a wavelength region in which the absorption peak exists, determining a transmission loss at the absorption peak due to the NBOHC, and estimating the amount of NBOHC in the core is based on the transmission loss measurement data, which is associated with a short-wavelength $\lambda$ with respect to a transmission loss in which the wavelength $\lambda$ of the optical fibers is less than or equal to 1000 nm, is converted into $\lambda^{-4}$, loss data of a wavelength region including a region other than a wavelength region in which $\lambda^{-4}$ is 4 to 8 and including at least a region in which $\lambda^{-4}$ is 2 to 3 that is subjected to linear approximation, wherein a difference between a transmission loss value of near 630 nm on an extension line of the linear approximation and a measured transmission loss of value of near 630 nm is defined as the transmission loss due to the NBOHC, and wherein the amount of NBOHC in the core is estimated based on the transmission loss due to the NBOHC and a peak transmission loss of the core is due to the NBOHC, wherein an exposure time that is required to complete a deuterium treatment using optical fibers manufactured under the same conditions is estimated by performing a linear regression on air atmosphere exposure time data to complete deuterium treatment of the optical fiber versus the NBOHC absorption loss at the wavelength of near 630 nm to obtain a correlation between the exposure time and the absorption loss at the wavelength of near 630 nm for a specific set of manufacturing conditions, and wherein the exposure time for the optical fiber is determined based on a peak transmission loss from the obtained transmission loss data.

4. The method according to claim 3, wherein the gas including the oxygen bridging element is a gas including deuterium.

* * * * *